(12) United States Patent
Sakura et al.

(10) Patent No.: US 7,580,943 B2
(45) Date of Patent: Aug. 25, 2009

(54) INFORMATION PROCESSING APPARATUS AND INFORMATION PROCESSING METHOD

(75) Inventors: Masayuki Sakura, Kawasaki (JP); Yasuhiro Kozuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 11/472,866

(22) Filed: Jun. 22, 2006

(65) Prior Publication Data

US 2007/0005561 A1 Jan. 4, 2007

(30) Foreign Application Priority Data

Jun. 29, 2005 (JP) ............................. 2005-189937

(51) Int. Cl.
*G06F 17/00* (2006.01)
(52) U.S. Cl. .................... 707/102; 707/10; 358/1.13; 358/1.14
(58) Field of Classification Search .................. 707/1, 707/10, 100–102; 715/507, 514, 517, 531; 358/1.14, 1.13
See application file for complete search history.

(56) References Cited

U.S. PATENT DOCUMENTS

| | | | | |
|---|---|---|---|---|
| 5,377,965 | A * | 1/1995 | Mandel et al. | 270/37 |
| 5,600,762 | A * | 2/1997 | Salgado et al. | 358/1.15 |
| 5,781,711 | A * | 7/1998 | Austin et al. | 358/1.15 |
| 5,790,119 | A * | 8/1998 | Sklut et al. | 715/839 |
| 5,872,569 | A * | 2/1999 | Salgado et al. | 715/764 |
| 6,134,568 | A * | 10/2000 | Tonkin | 715/209 |
| 6,149,323 | A | 11/2000 | Shima | |
| 6,509,974 | B1 * | 1/2003 | Hansen | 358/1.12 |
| 6,784,925 | B1 * | 8/2004 | Tomat et al. | 348/207.11 |
| 6,883,981 | B2 * | 4/2005 | Kizaki et al. | 400/61 |
| 6,886,036 | B1 * | 4/2005 | Santamaki et al. | 709/223 |
| 7,003,723 | B1 * | 2/2006 | Kremer et al. | 715/234 |
| 7,130,066 | B1 * | 10/2006 | Kanematu | 358/1.15 |
| 7,136,941 | B2 * | 11/2006 | Nguyen et al. | 710/15 |
| 7,151,611 | B2 * | 12/2006 | Sesek | 358/1.13 |
| 7,158,962 | B2 * | 1/2007 | Nelson | 707/2 |
| 7,394,562 | B2 * | 7/2008 | Nakagiri et al. | 358/1.18 |

(Continued)

FOREIGN PATENT DOCUMENTS

JP 2000-118095 A 4/2000

(Continued)

OTHER PUBLICATIONS

"The Impact of Market and technology Changes on Publishing and Printers"—Sean Smyth and John Birkensaw—Pira International Ltd. 2001 ISBN 1858023785—(pp. 1-127 (magiix.com).*

(Continued)

*Primary Examiner*—Jean B. Fleurantin
*Assistant Examiner*—Anh Ly
(74) *Attorney, Agent, or Firm*—Canon U.S.A., Inc. I.P. Division

(57) ABSTRACT

An information processing apparatus which includes a setting unit for setting parameters of a plurality of print properties to be assigned to file data stored in a folder, and for setting changeability information indicating whether the respective parameters are allowed to be changed when file data is stored in the folder; and a storage unit for storing the parameters and the changeability information in association with the folder.

11 Claims, 30 Drawing Sheets

U.S. PATENT DOCUMENTS

| | | |
|---|---|---|
| 7,495,796 B2 * | 2/2009 | Keane et al. ............... 358/1.18 |
| 7,526,483 B2 * | 4/2009 | Samji et al. .................... 707/10 |
| 2001/0043346 A1 * | 11/2001 | Roztocil et al. .............. 358/1.9 |
| 2003/0053133 A1 * | 3/2003 | Nakagiri et al. ............ 358/1.18 |
| 2003/0115326 A1 * | 6/2003 | Verma et al. ................ 709/225 |
| 2004/0008362 A1 * | 1/2004 | Sesek ........................ 358/1.14 |
| 2004/0107855 A1 * | 6/2004 | Kizaki et al. ................ 101/484 |
| 2004/0111418 A1 * | 6/2004 | Nguyen et al. .............. 707/100 |
| 2004/0111676 A1 * | 6/2004 | Jang et al. ................... 715/513 |
| 2005/0073717 A1 * | 4/2005 | Arakawa ................... 358/1.15 |
| 2005/0102327 A1 * | 5/2005 | Manki et al. ................ 707/200 |
| 2005/0105129 A1 * | 5/2005 | Takahashi .................. 358/1.15 |
| 2005/0105135 A1 * | 5/2005 | Takahashi .................. 358/1.18 |
| 2005/0157321 A1 * | 7/2005 | Alacar ....................... 358/1.13 |
| 2005/0179115 A1 * | 8/2005 | Rossi et al. .................. 257/639 |
| 2005/0200873 A1 * | 9/2005 | Yamakawa et al. ......... 358/1.13 |
| 2005/0246631 A1 * | 11/2005 | Mori et al. .................. 715/515 |
| 2005/0267797 A1 * | 12/2005 | Takahashi et al. .............. 705/11 |
| 2006/0044591 A1 * | 3/2006 | Matsuzaki et al. ......... 358/1.14 |
| 2006/0132834 A1 * | 6/2006 | Kamimura ................. 358/1.15 |
| 2007/0086024 A1 * | 4/2007 | Kremer et al. ............... 358/1.1 |
| 2007/0086037 A1 * | 4/2007 | Kitahara et al. ............ 358/1.13 |
| 2007/0086038 A1 * | 4/2007 | Matsuzaki ................. 358/1.13 |
| 2007/0113164 A1 * | 5/2007 | Hansen et al. .............. 715/500 |
| 2008/0239398 A1 * | 10/2008 | Nakagiri et al. ............ 358/1.18 |

FOREIGN PATENT DOCUMENTS

| | | |
|---|---|---|
| JP | 2000-222159 A | 8/2000 |
| JP | 2001-337801 A | 12/2001 |

OTHER PUBLICATIONS

"Test Engineering Education: A Guide to A Successful Cirriculum"—Louis Y. Ungar, A.T.E. Solution, Inc—AutoTestCon Processings, 2000 IEEE—Sep. 18-21, 2000 (pp. 273-283 or 1-11).*

* cited by examiner

FIG. 7

```
⎧  <OutputSize Size = "A4"/>  ──── 701
⎪  <Media MediaType = "Plain">              ⎫
⎪      <AttributeChange Flag ="ON" />       ⎬ 702
⎪  </Media>                                 ⎭
⎪  <Copies NumOfCopies = "10">              ⎫
⎨      <AttributeChange Flag = "ON" />      ⎬ 703
⎪  </Copies>                                ⎭
⎪  <Layout PageLayout = "4-up">             ⎫
⎪      <AttributeChange Flag = "ON" />      ⎬ 704
⎪  </Layout>                                ⎭
⎪  <Plex PlexType = "duplex" />  ──── 705
⎪  <Watermark Flag = "ON">                  ⎫
⎪      <WatermarkText Text = "CONFIDENTIAL" />  ⎬ 706
⎩  </Watermark>                             ⎭
```

| | FOLDER PATH | PRINTER | JOB TICKET |
|---|---|---|---|
| 805 | C:\user\sakura\desktop\duplex | 192.168.0.100 | duplex.xml |
| 806 | C:\user\sakura\desktop\booklet | 192.168.0.200 | booklet.xml |
| 807 | C:\user\sakura\desktop\4up-10copies-duplex | 192.168.0.100 | 4up-10copies-duplex.xml |
| | ⋮ | ⋮ | ⋮ |

802   803   804

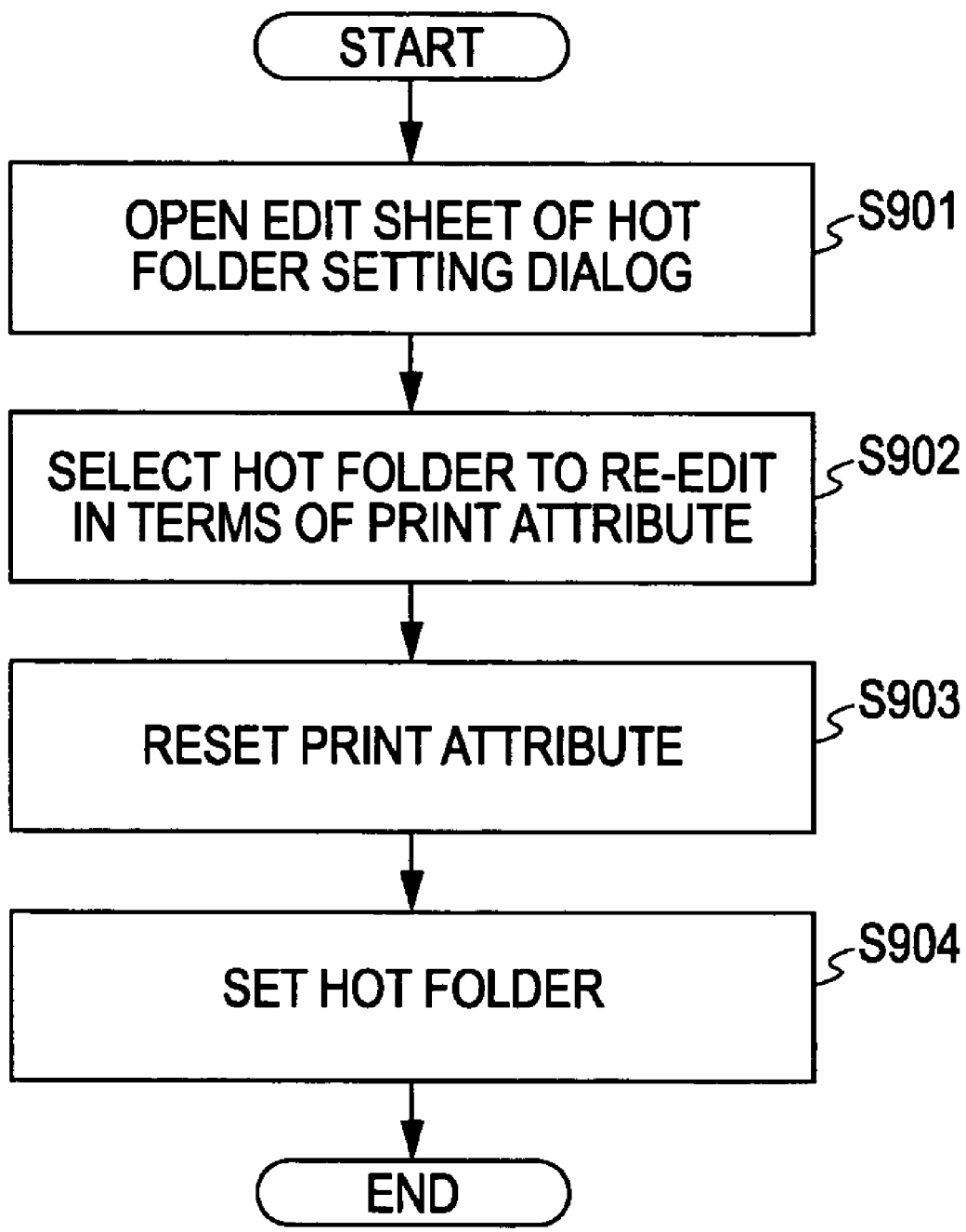

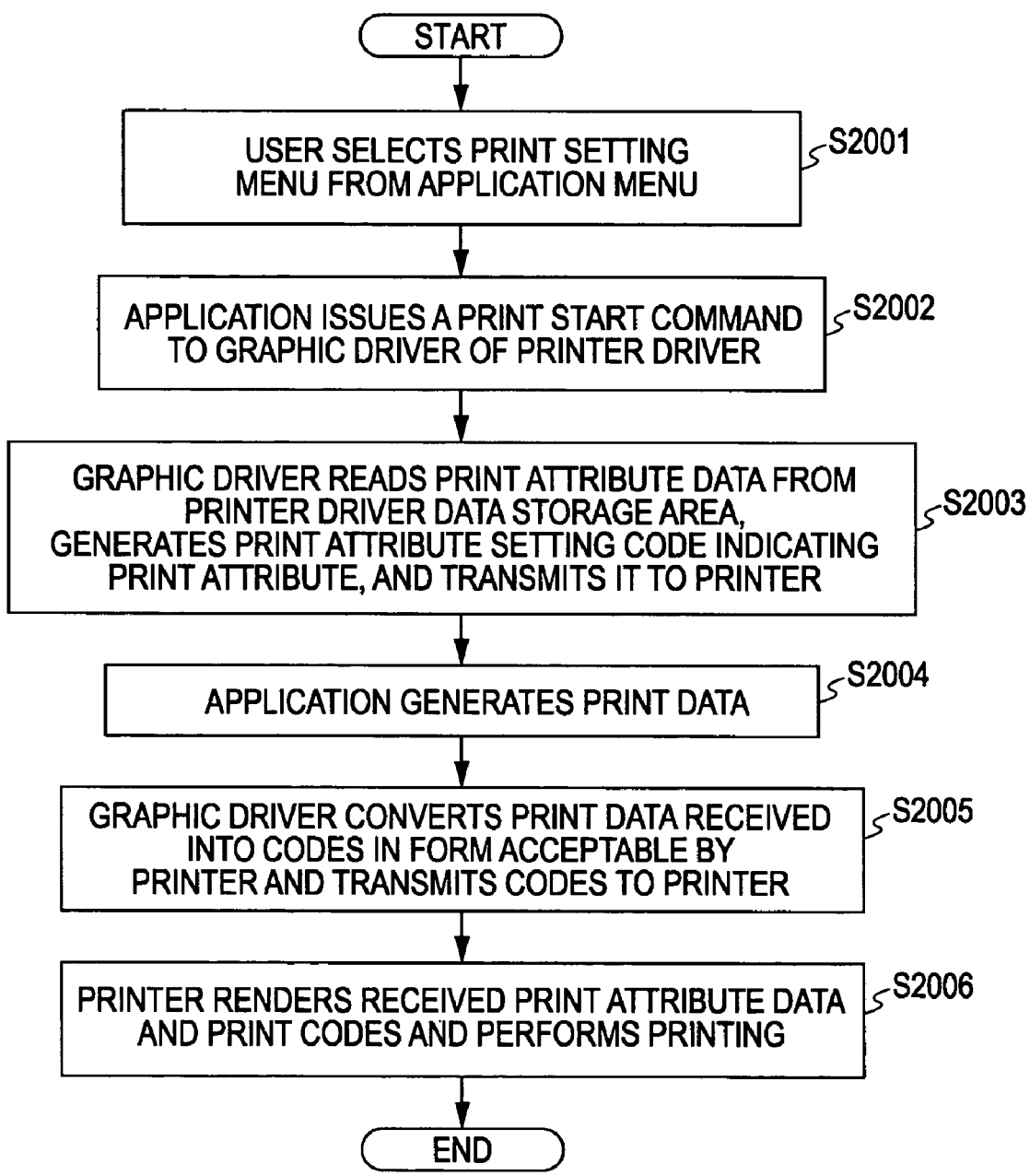

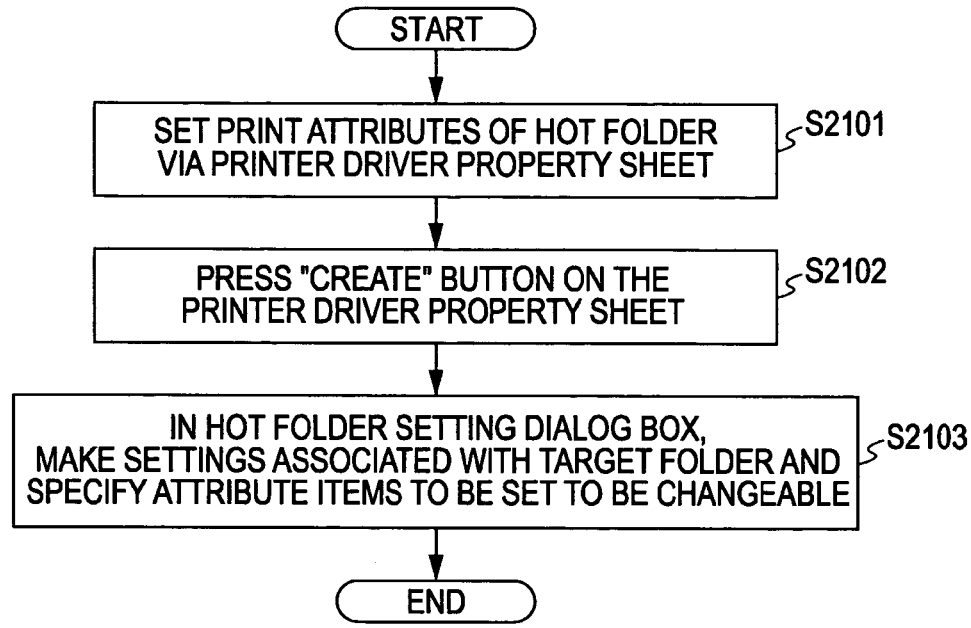
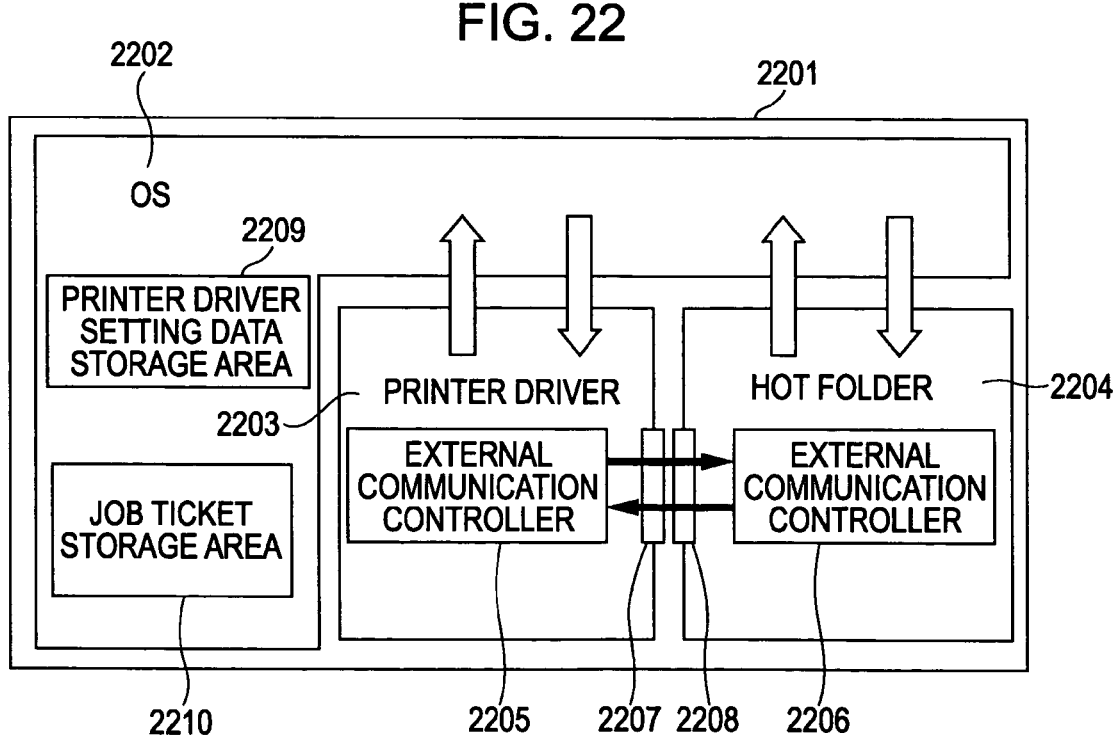

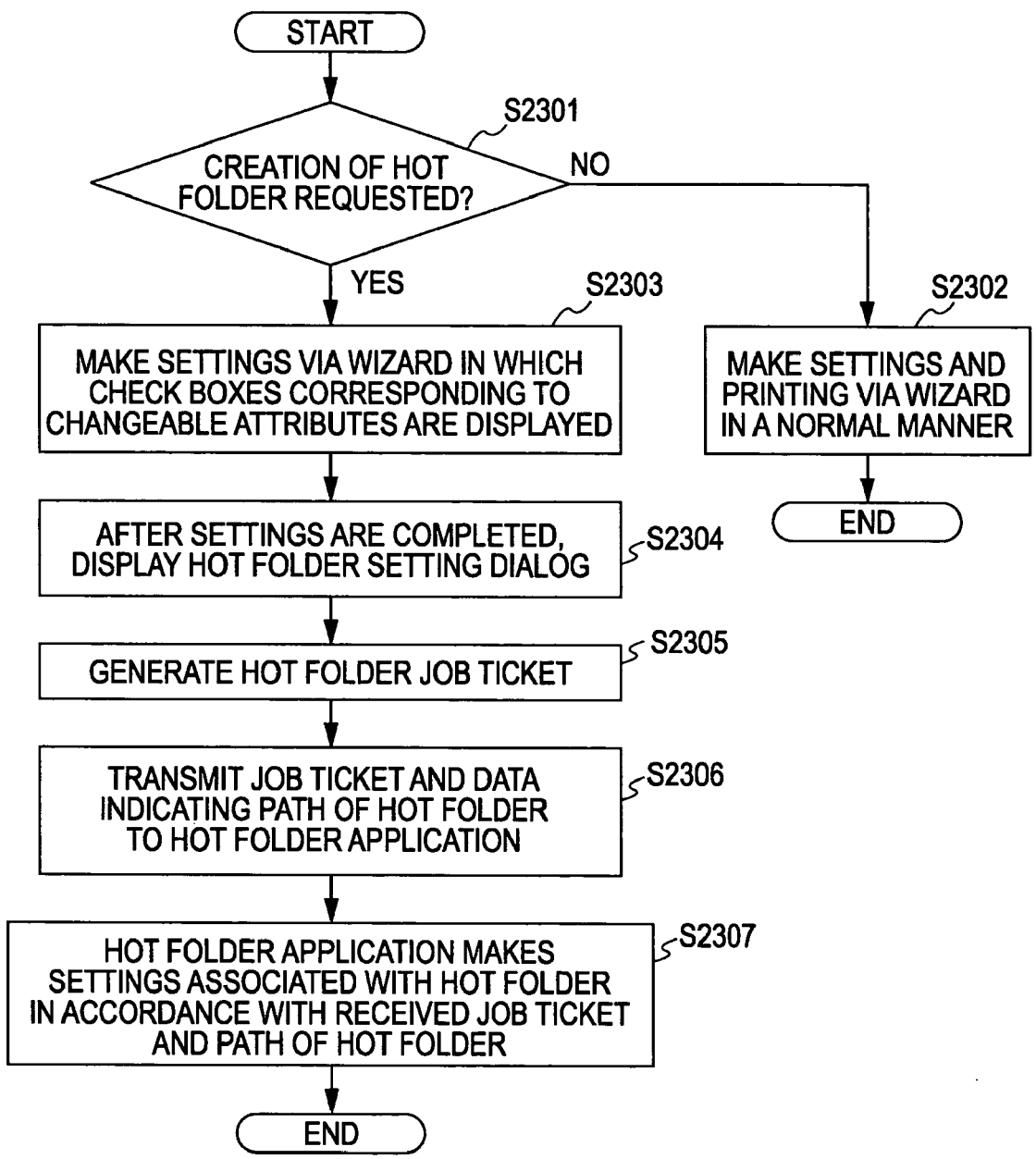

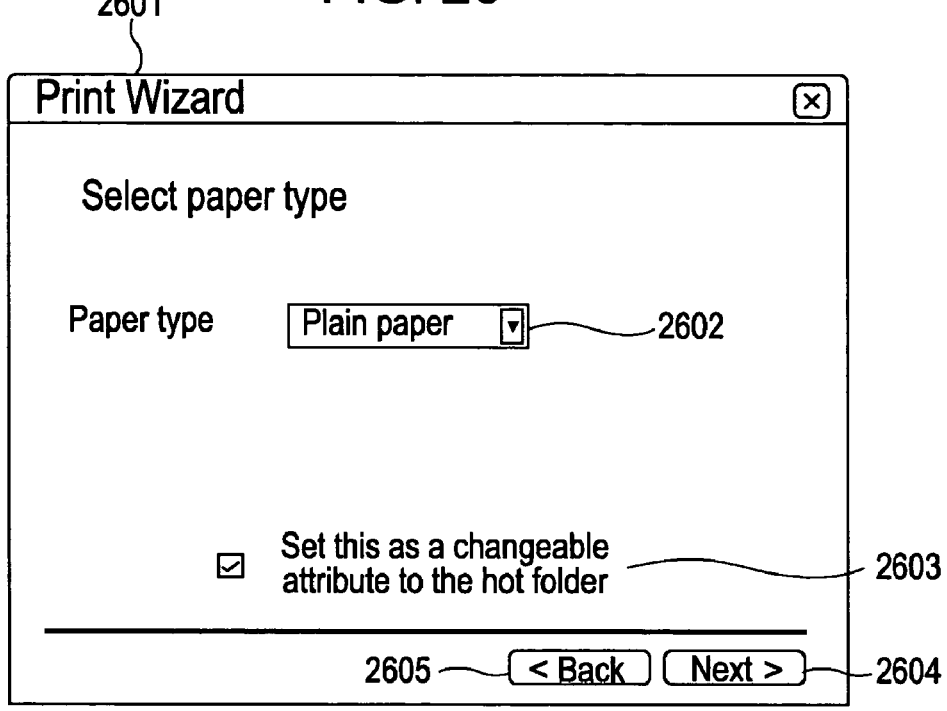
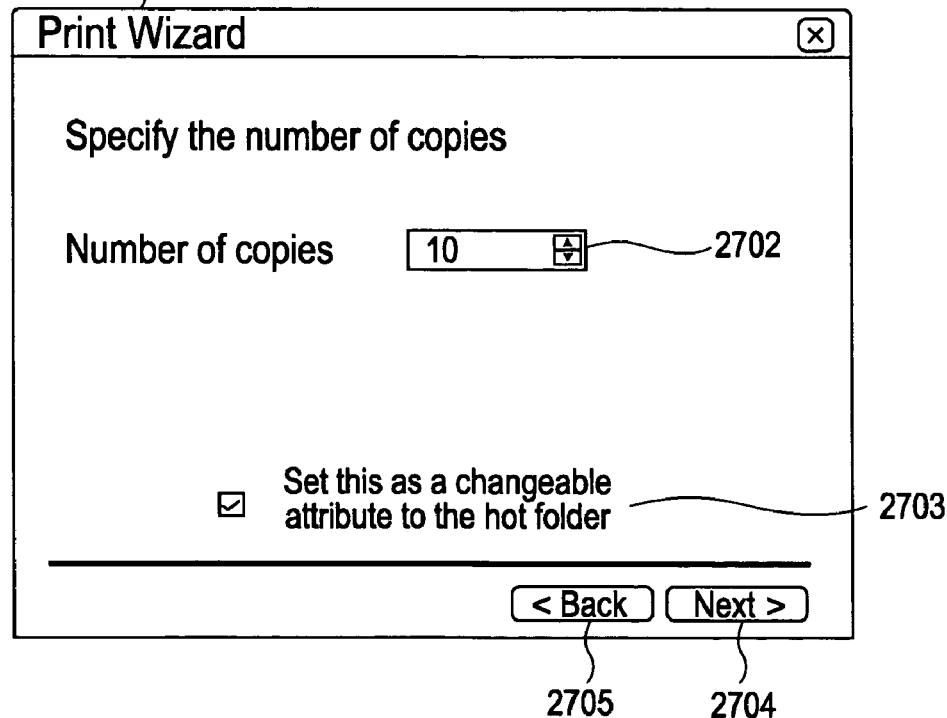

{
<OutputSize Size = "A4"/> — 2901
<Booklet BookletType = "Saddle Stitch"> — 2902
<Media MediaType = "Plain">
    <AttributeChange Flag ="ON" />
</Media>
} 2903
<Copies NumOfCopies = "10">
    <AttributeChange Flag = "ON" />
</Copies>
} 2904

INFORMATION PROCESSING APPARATUS AND INFORMATION PROCESSING METHOD

BACKGROUND OF THE INVENTION

1. Field of the Invention

The present invention relates to an information processing apparatus and an information processing method that allows printing using a hot folder.

2. Description of the Related Art

A technique known as hot folder printing allows data created by an application running on a computer to be easily printed using a hot folder. In the hot folder printing technique, a folder to which print properties are set is created in advance on a desktop screen or the like of a computer. If a data file to be printed is dragged and dropped into that folder, the data file is printed in accordance with print properties set to the folder.

Conventionally, print properties are set to a hot folder in several different manners. In a first approach, desired print properties are defined in advance in association with a particular hot folder so that when a file to be printed is dragged and dropped into that hot folder, printing is performed in accordance with the defined print properties (see, for example, Japanese Patent Laid-Open No. 2000-118095).

In another known technique of performing printing in accordance with predefined print properties, print properties are stored on a printer driver so that the stored print properties can be easily called when printing is performed (see, for example, Japanese Patent Laid-Open No. 2000-222159). This technique is different from the hot folder printing technique in that a set of print properties is stored as a "favorite set of print properties" so that when printing is performed, it is allowed to select the favorite set of print properties and perform printing in accordance with the favorite set of print properties. As required, it is allowed to modify some print property before printing is started.

It is also known to check validity of specified print properties such that although any parameter values are allowed when print properties are defined in advance, validity of specified parameter values of print properties is checked on a print preview screen before printing is started (see, for example, U.S. Pat. No. 6,134,568).

SUMMARY OF THE INVENTION

An information processing apparatus and an information processing method are provided which allow a user to perform printing in accordance with print properties assigned to a hot folder. A user is allowed to change print properties to desired values when printing is performed using the hot folder, without causing a reduction in convenience. It becomes unnecessary to create a large number of hot folders corresponding to different parameter values, and thus it becomes possible to manage hot folders in an easy and efficient manner. When print properties are set for a hot folder, a user specifies whether each print property item is allowed to be changed when printing is performed, and each print property item is set to be changeable or unchangeable as specified by the user. When a file to be printed is dropped into the hot folder, a dialog is displayed to allow the user to change printer properties set as changeable.

According to a first exemplary embodiment of the present invention, an information processing apparatus is provided which includes a setting unit configured to set parameters of a plurality of print properties to be assigned to file data stored in a folder, and set changeability information indicating whether the respective parameters are allowed to be changed when file data is stored in the folder; and a storage unit configured to store the parameters and the changeability information in association with the folder.

According to an aspect of the aforementioned embodiment, the folder may be a hot folder, and storing of file data into the folder is performed by dragging and dropping the file data into the hot folder. According to another aspect of the instant embodiment, the information processing apparatus may also include a display unit configured to, when file data is stored into the folder, acquire the changeability information stored in the storage unit and display a resetting screen for resetting parameters of printer properties that are specified as being changeable by the changeability information.

According to another aspect of the present embodiment, the information processing apparatus may further include a determination unit configured to, when a parameter is changed via the resetting screen, determine whether the changed parameter meets a condition required in printing. And according to yet another aspect of the present invention, the determination unit determines that the changed parameter does not meet the condition required in printing, the display unit again displays the resetting screen for resetting the parameter.

Still further, according to another aspect of the aforementioned embodiment, the information processing apparatus may further include a generation unit configured to generate a job ticket in which parameters and changeability information related to the folder are described in structured language, wherein when file data is stored into the folder, the display unit displays the resetting screen in accordance with the changeability information described in the job ticket.

According to another exemplary embodiment of the present invention, an information processing method is provided which includes setting parameters of a plurality of print properties to be assigned to file data stored in a folder; setting changeability information indicating whether the respective parameters are allowed to be changed when file data is stored into the folder; and storing the set parameters and the changeability in association with the folder.

Furthermore, according to an aspect of the aforementioned embodiment, the folder may be a hot folder, and storing of file data into the folder is performed by dragging and dropping the file data into the hot folder. Moreover, according to yet another aspect of thee present invention, the method may further include displaying a resetting screen such that when file data is stored into the folder, the changeability information is acquired and the resetting screen is displayed for resetting parameters of printer properties that are specified as being changeable by the changeability information.

And, according to yet another aspect of the embodiment, the method may also include determining whether the changed parameter meets a condition required in printing when a parameter is changed via the resetting screen. Further, according to another aspect of the instant embodiment, when the determination is that the changed parameter does not meet the condition required in printing, the resetting screen is displayed again for resetting the parameter. Additionally, according to yet another aspect of the present invention, the method may include generating a job ticket in which parameters and changeability information related to the folder are described in structured language, wherein when file data is stored into the folder, the resetting screen is displayed with the changeability information described in the job ticket.

Moreover, according to another exemplary embodiment of the present invention, a program for controlling a computer to execute an information process is provided. The program includes instructions to set parameters of a plurality of print properties to be assigned to file data stored in a folder; instructions to set changeability information indicating whether the respective parameters are allowed to be changed when file data is stored into the folder; and instructions to store the set parameters and the changeability information set in association with the folder.

And finally, according to yet another exemplary embodiment of the present invention, a computer-readable storage medium containing computer-executable instructions for controlling an information processing apparatus is provided. The medium may include instructions for setting parameters of a plurality of print properties to be assigned to file data stored in a folder; instructions for setting changeability information indicating whether the respective parameters are allowed to be changed when file data is stored into the folder; and instructions for storing the set parameters and the changeability information in association with the folder.

Other embodiments, features, aspects and advantages of the present invention will become apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate numerous embodiments, features and aspects of the present invention and, together with the description, serve to explain the principles of the invention.

FIG. 7 shows an example of an exemplary job ticket according to an aspect of the present embodiment.

FIG. 8 shows an exemplary job ticket management table according to an aspect of the present embodiment.

FIG. 9 is a flow chart of an exemplary process of editing a hot folder according to an aspect of the present embodiment.

FIG. 20 is a flow chart of an exemplary printing process performed via a printer driver according to an aspect of the present embodiment.

FIG. 21 is a flow chart of an exemplary process of creating a hot folder associated with a printer driver according to an aspect of the present embodiment.

FIG. 22 is a diagram showing an exemplary relationship between a printer driver and a hot folder according to an aspect of the present embodiment.

FIG. 23 is a flow chart of an exemplary process of creating a hot folder using a wizard according to a third embodiment of the present invention.

FIG. 26 shows an exemplary wizard dialog sheet for specifying a paper type according to an aspect of the present embodiment.

FIG. 27 shows an exemplary wizard dialog sheet for specifying the number of copied according to an aspect of the present embodiment.

DESCRIPTION OF THE EMBODIMENTS

Numerous preferred embodiments, features and aspects of the present invention will now be described in detail in accordance with the accompanying drawings.

First Exemplary Embodiment

[Exemplary System Configuration]

Figure 1:
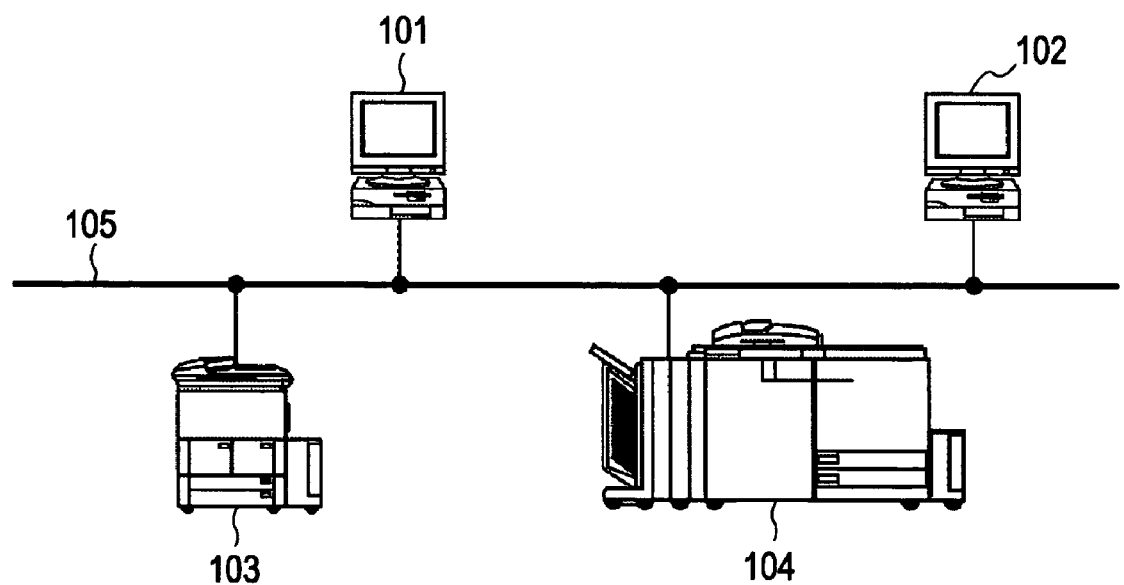
FIG. 1 is a schematic diagram of an exemplary hot folder printing system according to a first embodiment of the present invention.

FIGS. 1 to 14 show an exemplary printing system according to a first embodiment of the present invention. FIG. 1 shows an example of a printing system using a hot folder. In FIG. 1, reference numerals 101 and 102 denote client computers that issue a print command. Reference numerals 103 and 104 denote printers that are connectable to a network 105 and are capable of performing a printing process in accordance with a print job received from a client computer (101 or 102). An operating system is installed on each client computer (101 and 102) and a hot folder application is installed on the operating system. It is noted that the present invention is not limited to the exemplary system configuration shown in FIG. 1; rather, the system may be configured in many other ways.

Figure 2:
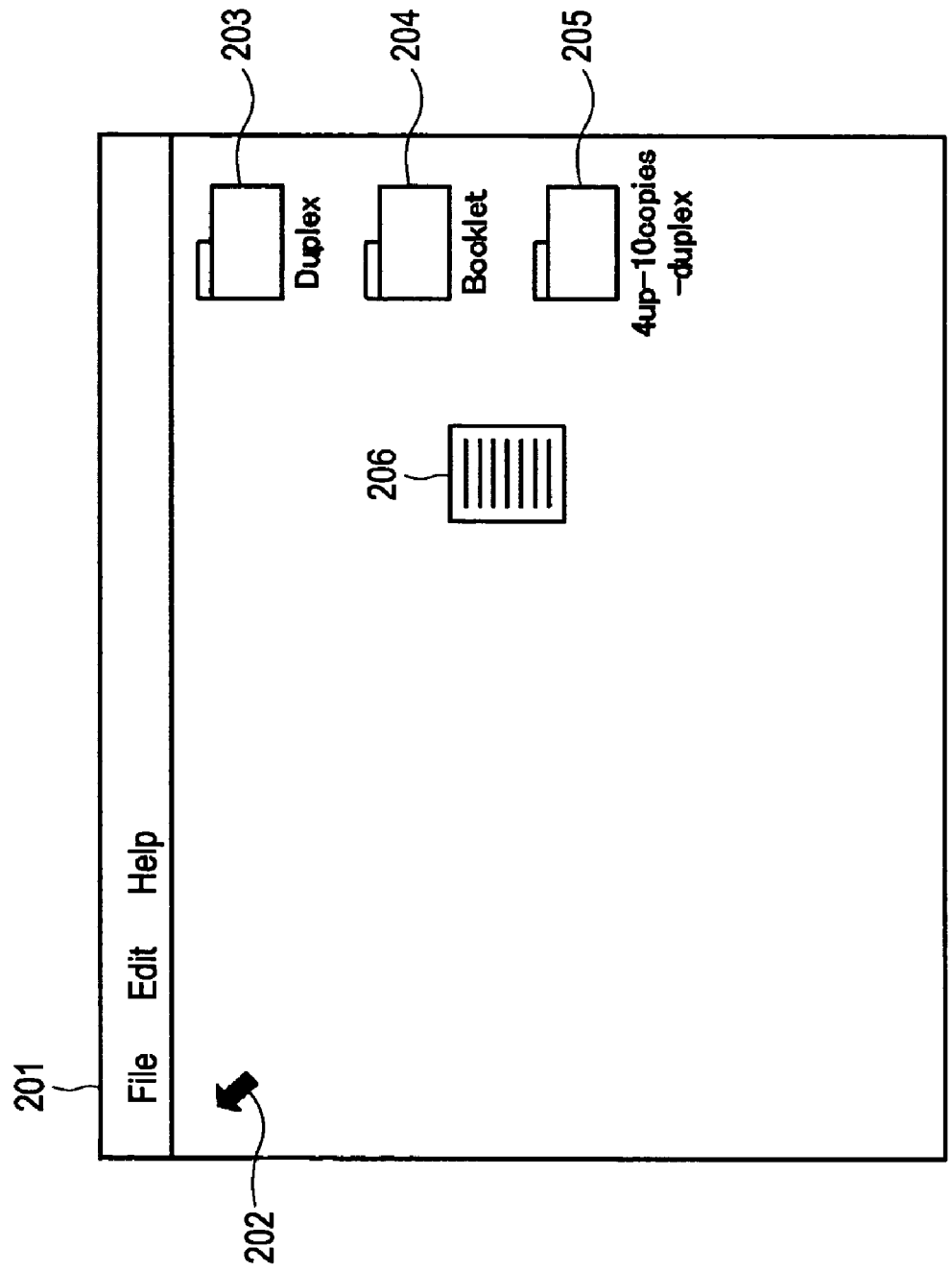
FIG. 2 shows an exemplary desktop screen of a client computer in which a hot folder is defined according to an aspect of the present embodiment.

With reference to FIG. 2, an exemplary printing operation using a hot folder is described below. FIG. 2 schematically shows a screen of a display of the client computer 101 or 102. Reference numeral 201 denotes a desktop screen, Reference numeral 202 denotes a mouse cursor, and reference numeral 206 denotes a file that is to be printed.

Herein, it is assumed that the file to be printed is described in a format that can be handled by a network printer (103 or 104). Examples of such formats are PDF (Portable Document Format), PS (Post Script), JPEG, and TIFF. Note that there can be other formats that can be handled by network printers.

In FIG. 2, hot folders 203, 204, and 205 are located on the desktop screen 201. For example, print properties associated with the hot folder 203 are set for use in printing in a duplex mode, and print properties associated with the hot folder 204 are set for use in printing in a booklet mode. For the hot folder 205, print properties are set such that printing is performed for 10 copies in a 4-up layout (4 logical pages are printed on one physical page) on both sides of each sheet. These hot folders are created via a hot folder creation process that will be described in detail later.

It is also noted that although in the specific example shown in FIG. 2, hot folders are displayed (located) on the desktop screen 201, it is not necessarily needed to locate hot folders on the desktop screen.

When a user performs a printing operation using such a hot folder, the printing operation is performed as follows. First, using a pointing device such as a mouse, the user drags the data file 206, for example, to the hot folder 204 for printing in the booklet (binding) mode, and then the user drops the data file into the hot folder 204 by releasing a mouse button.

In response, a hot folder application (which will be described in detail later) converts the data file into a form to be used in printing in the booklet (binding) mode and transmits the resultant data file together with the print property information to the network printer via the operating system to perform printing.

Figure 3:
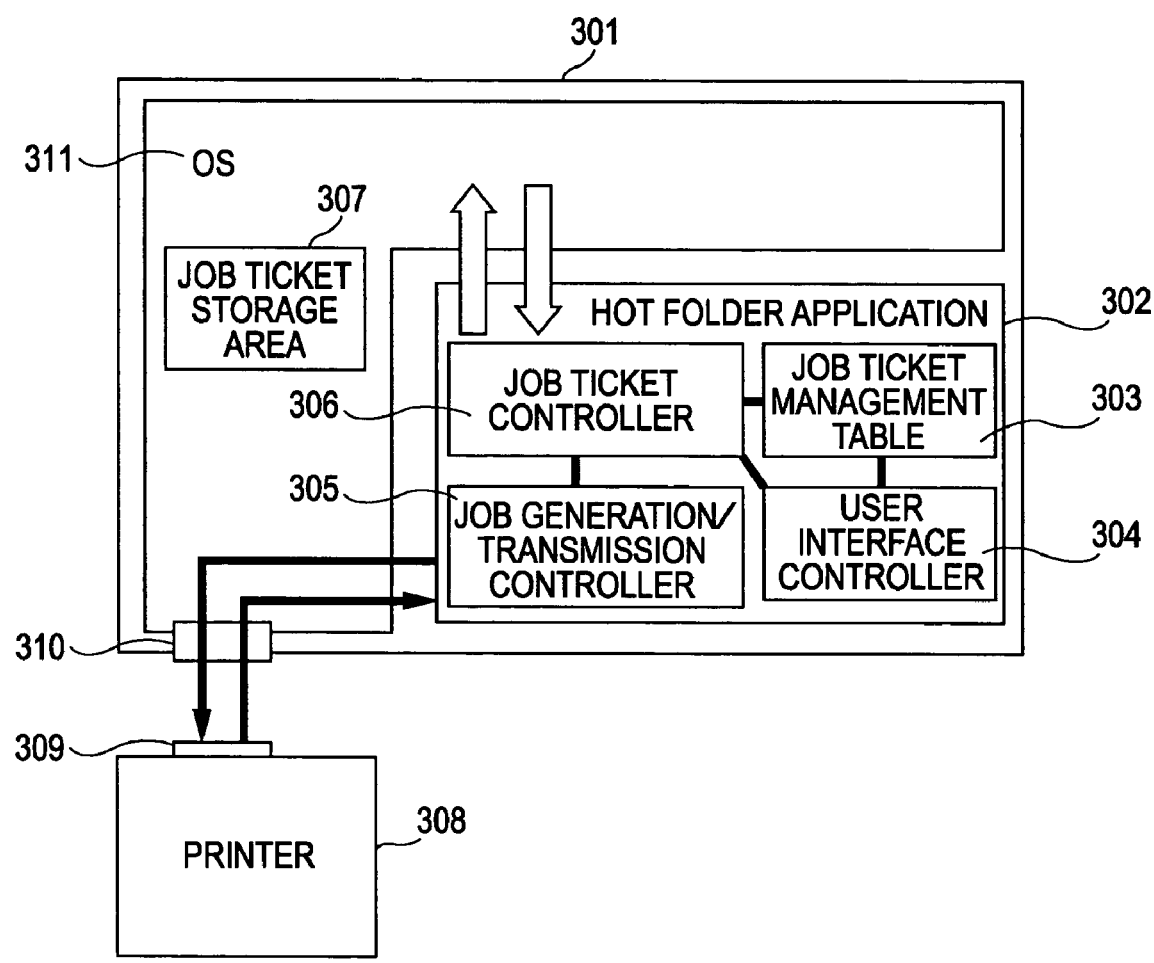
FIG. 3 is a block diagram showing an exemplary operating system and a hot folder application installed on a computer according to an aspect of the present embodiment.

Now, the exemplary configuration of hot folders and a user operation performed on hot folders are described below. FIG. 3 is a block diagram showing an exemplary operating system installed on a client computer (such as that denoted by reference numeral 101 or 102 in FIG. 1) and a hot folder application. Reference numeral 301 denotes a client computer on which an operating system 311 is installed. A hot folder application 302 is an application program installed on the operating system 311. The operating system 311 controls activation and deactivation of the hot folder application 302.

The operating system 311 also performs various processes that are needed in operations performed by the hot folder application 302.

Although in the present embodiment, it is assumed that the hot folder application is an application in an execute form, the hot folder application may be a service registered in an operating system. Furthermore, in the present embodiment, it is assumed, by way of example but not limitation, that the hot folder application generates and stores a job ticket in which print properties specified by a user are described in a XML format. Note that the XML format is a format in which data is described in a structured language called extensible Markup Language (XML), which is also called a meta language or meta data.

It is also assumed that the printer 308 corresponding to a network printer (103 or 104) shown in FIG. 1 is capable of interpreting print properties described in a generated job ticket.

The hot folder application 302 includes a user interface controller 304 that controls setting of print properties or the like and job ticket controller 306 that generates a job ticket in accordance with print properties specified by a user via the user interface controller 304 and that stores the resultant job ticket. The hot folder application 302 further includes a job ticket management table 303 in which the correspondence among job tickets, folders, and printers is described.

The hot folder application 302 also includes a job generation/transmission controller 305 that generates a print job in accordance with a file dropped into a hot folder and in accordance with a job ticket associated with that folder and transmits the generated print job.

In the present embodiment and also in other embodiments described later, it may be assumed that the process of generating and storing a job ticket is performed by the job ticket controller 306, and the process of generating or updating the job ticket management table 303 is performed by another program module of the hot folder application 302.

The job ticket generated by the job ticket controller 306 is stored in a job ticket storage area 307 of the operating system 311 via an API (Application Programming Interface) of the operating system 311. A network interface 310 of the client computer 301 is connected to a network interface 309 of the printer 308 via a communication medium so that print jobs and/or information indicating status of the printer are transmitted via the network interface 310.

[Exemplary Hot Folder Creation Process]

Figure 4:
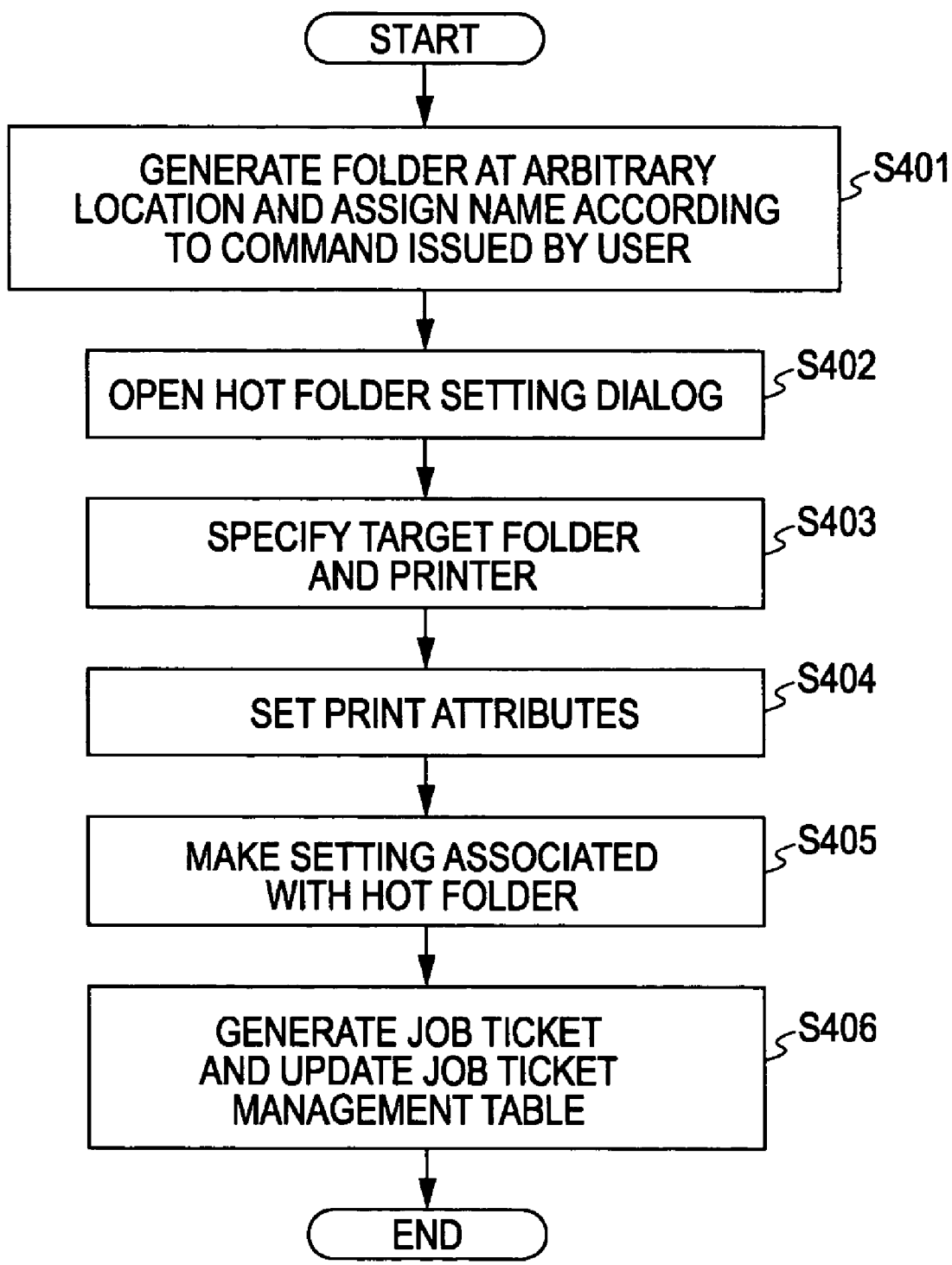
FIG. 4 is a flow chart of an exemplary process of producing a hot folder according to an aspect of the present embodiment.

Now, an exemplary process performed by a user to create a hot folder is described. FIG. 4 is a flow chart showing this process. In this specific example, it is assumed that a user makes settings in terms of print properties for a hot folder such that a page layout is set as 4-up (4 pages per sheet), a single/double-sided mode is set as a double-sided mode, and the number of copies is set as 10 copies. The setting process described below is performed by a user via an interface provided by the operating system or the hot folder application 302 running on the client computer.

First, in step S401, the user creates a folder at an arbitrary location and assigns a proper name to the created folder. In many cases, for better convenience, the hot folder is created on the desktop screen of the client computer. It is desirable to assign a name to a folder such that print properties can be easily guessed from the name assigned to the folder. An example assigned to the folder is "4up-10copies-duplex". As a result of the above process, a folder 205 named "4up-10copies-duplex" is created on the desktop screen as shown in FIG. 2. The process of the creating the hot folder is performed in a similar manner to a normal folder creation process performed by the operating system.

In step S402, the user activates the hot folder application 302. If the hot folder application 302 is activated, the hot folder application 302 displays a hot folder setting dialog sheet. Note that displaying of various dialogs associated with the hot folder application 302 and information input via such dialogs are managed by the user interface controller 304.

Figure 5:
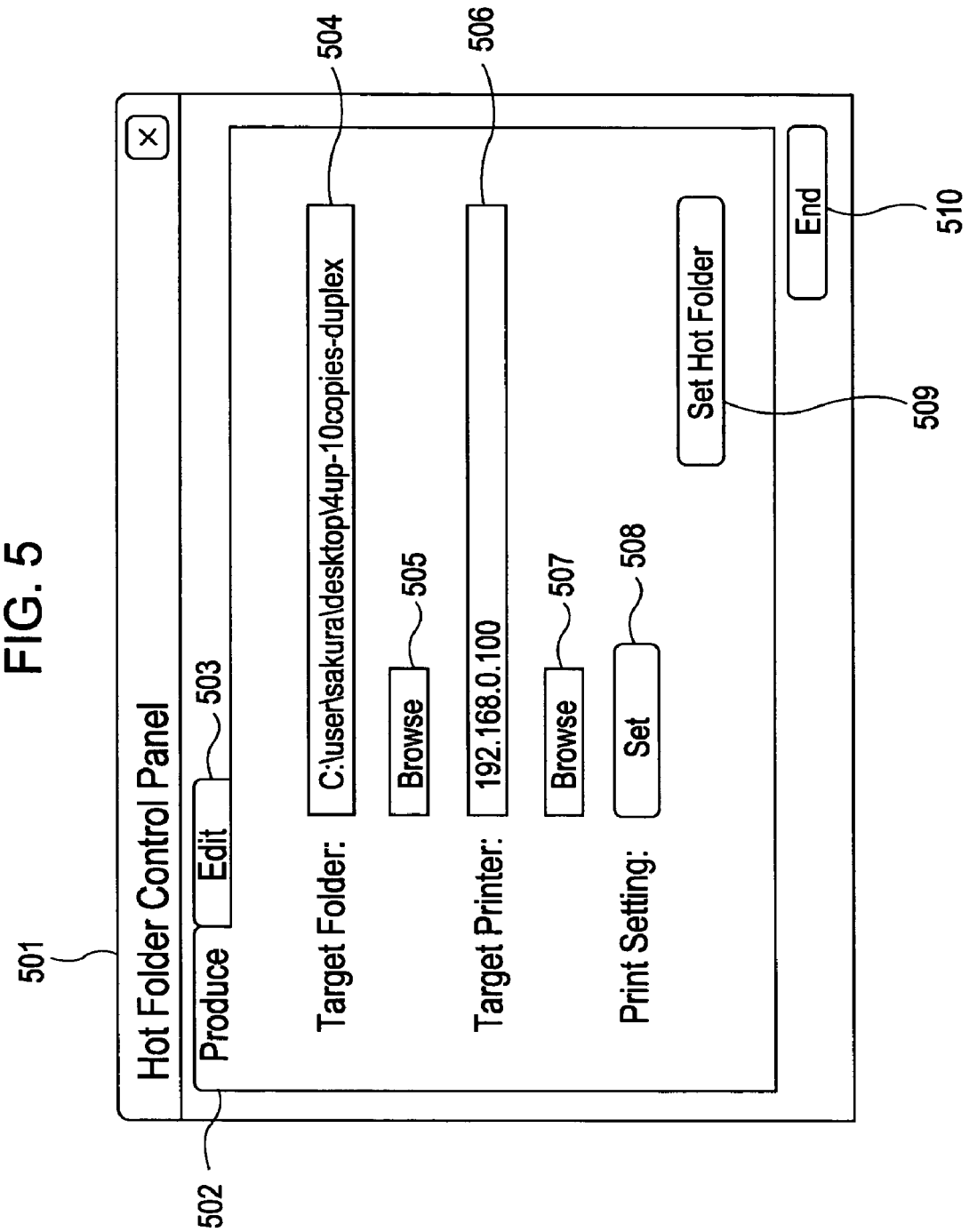
FIG. 5 shows an exemplary hot folder setting dialog sheet according to an aspect of the present embodiment.

FIG. 5 shows an example of a hot folder setting dialog sheet. Reference numeral 501 denotes a hot folder setting dialog sheet, and reference numeral 502 denotes a sheet for inputting items necessary to create a hot folder. Reference numeral 503 denotes a sheet for editing settings of an existing hot folder.

On the sheet 502, a control box 504 and a button 505 are displayed. The control box 504 is used to specify a folder path of a target folder to be created as a hot folder, and the button 505 is used to open a dialog sheet that allows a user to select a folder from a list or the like instead of directly inputting a target folder path in the control box 504.

The sheet 502 also includes a target printer specifying control box 506 for selecting a target printer and a button 507 used to open a dialog sheet that allows a user to select a printer from a list or the like instead of directly specifying a target printer via the control box 502. Herein, it is assumed that an IP address (for example, 192.168.0.100) of the target printer is input in the control box 506 to specify the target printer. Note that other data may be used if the data can identify a printer.

A setting button 508 is used to open a print property setting dialog for setting print properties associated with the hot folder. A hot folder setting button 509 is used to apply the print properties and the target printer specified via the hot folder setting dialog sheet 501 to the target hot folder. That is, if this button 509 is clicked, the folder created in step S401 is set as a hot folder. If a button 510 is clicked, the hot folder application is ended. The process described below is performed by the user via this hot folder setting dialog.

Now referring back to FIG. 4, in step S403, the folder created in step S401 is specified as the target folder. As described above, in step S401, a folder named "4up-10copies-duplex" was created on the desktop screen, and thus in step S403, for example, "c:\user\sakura\desktop\4up-10copies-duplex" is input via the target folder specifying box 504. Instead, the target folder may be specified using the browse button 505. Note that the folder path preceding the folder name depends on the operating system. In step S403 described above, a target printer is also specified. The target printer may be specified by inputting, in the target printer specifying control box> 506, information identifying a printer to be used in printing using the hot folder. In the present embodiment, it is assumed that an IP address of a printer to be used as the target printer is input. Note that other information identifying a printer may be used to specify the target printer. Instead, the target printer may also be specified using the browse button 507.

In step S404, print properties associated with the target folder are set. In this step, the user first clicks the print property setting button 508 to start the process of setting print properties. If this button is clicked, the hot folder application 302 displays a print property setting dialog such as that shown in FIG. 6.

Figure 6:
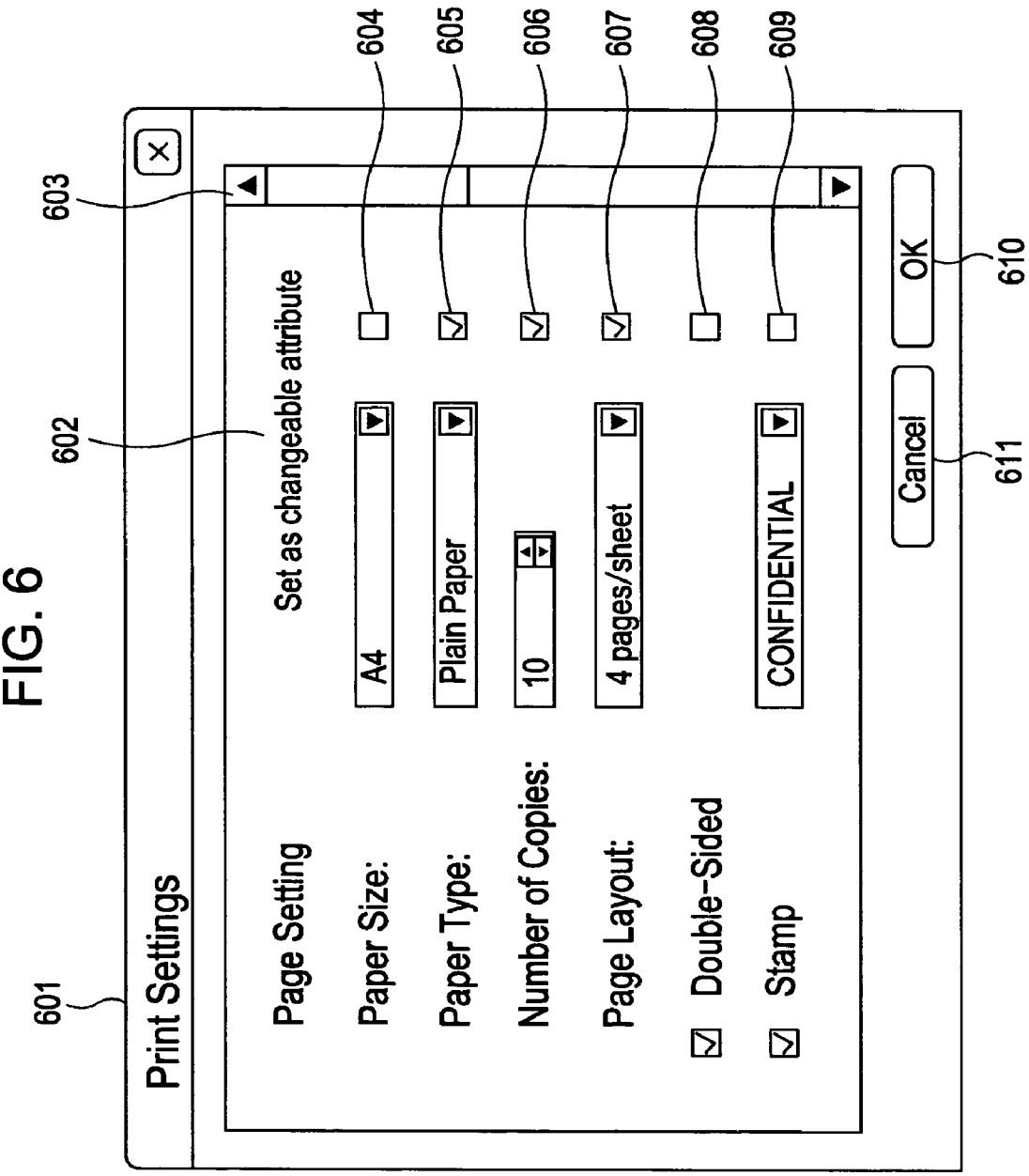
FIG. 6 shows an exemplary print property setting dialog sheet according to an aspect of the present embodiment.

FIG. 6 shows an example of a dialog sheet for setting print properties associated with the hot folder. Reference numeral 601 denotes the print property setting dialog, and reference numerals 604 to 609 denote print property items. Note that only some print properties are displayed on the dialog sheet shown in FIG. 6, and print property items other than those currently shown in FIG. 6 can be displayed by using a scroll bar 603. In the present invention, there is no particular restriction on types of print properties, that is, types of properties are not essential to the present invention. Therefore, the following description is limited to particular print property items, and a description is not given for all print properties.

In the present embodiment, it may be assumed that print properties of the target folder are set such that the output paper size is set to A4, the paper type is set to plain paper, the number of copies is set to 10, the page layout is set to 4 pages/sheet, the single/double-sided mode is set to a double-sided mode, and the watermark mode is set ON ("CONFIDENTIAL" is specified as a watermark), as shown in FIG. 6.

In FIG. 6, changeability check boxes 602 are used to specify whether it is allowed to change print property items (parameters) set herein via this setting sheet 601 when a file is dropped into the hot folder. One changeability check box is provided for each print property item so that the changeability can be specified individually for each print property item.

In the example shown in FIG. 6, a changeability check box 605 for specifying the changeability of the paper type, a changeability check box 606 for specifying the changeability of the number of copies, a changeability check box 607 for specifying the changeability of the page layout are checked. That is, the paper type, the number of copies, and the page layout are changeable from parameters set in this dialog sheet 601 when a file is dropped into the hot folder. Changeability check boxes for specifying changeability of other print property items may be checked as required.

After respective print properties and changeability thereof are set, if the user clicks an OK button 610, the settings are applied. That is, if the OK button 610 is clicked, the hot folder application stores data indicating the specified settings in a particular storage area and closes the print property setting dialog 601. If a cancel button 611 is clicked, the settings are cancelled and the hot folder setting dialog sheet 501 shown in FIG. 5 appears again.

Now referring back to FIG. 4, in step S405, if the user decides that the settings specified in step S403 and step S404 should be applied, the user clicks the "Set Hot Folder" button 509 on the hot folder setting dialog sheet 501 shown in FIG. 5.

If the "Set Hot Folder" button 509 is clicked in step S405 by the user, the process proceeds to step S406. In step S406, the job ticket controller 305 of the hot folder application 302 generates a job ticket associated with the specified target folder in accordance with the information indicating the settings specified by the user, and the job ticket controller 305 updates the job ticket management table as well as the information indicating the specified target printer. The details of the job ticket and the job ticket management table will be described later.

In step S405 described above, before the job ticket is generated, the hot folder application 302 may determine whether it is possible to perform printing according to the print properties specified by the user by using the target printer specified by the user. For example, there is a possibility that the user specifies A3 as the paper size, although the target printer specified by the user does not have the capability of using A3-size paper. To avoid such a problem, when the "Set Hot Folder" button 509 is clicked by the user, the hot folder application 302 may check the consistency/conflict between information indicating functions available in the specified target printer and print properties specified by the user to prevent print properties from being set to invalid values. If the print properties specified by the user include an invalid parameter value, it is desirable to display a warning dialog (not shown) to notify the user that the print properties specified by the user include an invalid parameter value and to prompt the user to change the target printer or the invalid print property parameter.

Instead of specifying the target printer and the print properties at the same time, the target printer may be specified first, and, depending on the specified target printer, the hot folder application 302 may display only printer properties that are allowed to be set to the specified target printer. In this setting procedure in which the printer is first specified and then print properties are specified by the user, it is possible to prevent the print properties from being set to invalid parameter values without having to perform the validity check.

Note that it is assumed that the hot folder application 302 acquires in advance information indicating what functions the target printer has.

[Exemplary Updating of Job Ticket and Management Table]

A description is given below as to an exemplary process performed in step S406 shown in FIG. 4 by the hot folder application to generate and store a job ticket and also as to the job ticket management table.

FIG. 7 shows an example of a job ticket in which print properties specified in the above-described manner are described. The job ticket refers to information that is transmitted together with print data to a printer and that specifies how the printer should handle the print data in the printing operation. In other words, the job ticket serves as a print command given to the printer. Although in the present embodiment, the job ticket is described in the XML format, the format is not limited to XML as long as print properties can be described in a readable form.

A specific example of the content of the job ticket described in the XML format is explained below. In a row denoted by reference numeral 701 in FIG. 7, the paper size is specified. In this specific example, A4 is specified as the paper size according to the setting made via the paper size setting dialog 604. In rows 702, the paper type is specified. In this specific example, "Plain" paper is specified. Because the paper type is set as a changeable print property via a check box of the print property setting dialog 601, the job ticket includes information indicating that the paper type is changeable. More specifically, in the example of the job ticket shown in FIG. 7, "AttributeChange" is described as a tag in terms of attribute changeability, "Flag" is described as a key, and "ON" is described as a key value. That is, in total, for print attributes that are set as unchangeable, no tags are described in the job ticket to minimize the data size of the job ticket. When no tags are described in the job ticket, it should be regarded that "OFF" is specified. As a matter of course, the unchangeable state may be explicitly described such as <AttributeChange="OFF">.

In rows denoted by reference numeral 703, the number of copies is specified as 10, and the changeability thereof is specified as changeable. In rows denoted by reference numeral 704, the page layout is specified as 4 pages/sheet, and the changeability thereof is specified as changeable.

In rows denoted by reference numeral 705, the single/double-sided mode is specified as the double-sided mode, and the changeability thereof is specified as unchangeable. In rows denoted by reference numeral 706, the watermark printing is set as ON, and "CONFIDENTIAL" is specified as the watermark to be printed.

It is noted that although only print properties shown in FIG. 6 are shown in FIG. 7, other print properties may also be described in a similar manner in the job ticket. An arbitrary name is assigned to the job ticket generated in the above-described manner, and is stored, via an API (Application Programming Interface) of the operating system 311, into a job ticket storage area 307 in a storage area managed by the operating system 311.

Now, an exemplary job ticket management table is described below. FIG. 8 shows a job ticket management table 801 stored in the hot folder application 302. Note that this job ticket management table 801 is described as the job ticket management table 303 in FIG. 3. The job ticket management table 801 includes a folder path fields 802 in which folder paths of target folders specified as hot folders are described. In fields 803, information associated with printers specified as target printers are described. In job ticket name fields 804, names of job tickets are described. Note that the job ticket management table 801 may further fields in addition to the above-described fields. This job ticket management table 801 represents the correspondence between the target folders specified as hot folders and the job tickets in which print properties specified via the above-described hot folder creation process are described. In FIG. 8, reference numeral 805 denotes a job ticket corresponding to the hot folder 203, reference numeral denotes a job ticket corresponding to the hot holder 204, and reference numeral 807 denotes a job ticket corresponding to the hot holder 205.

In the example of the job ticket management table 801 shown in FIG. 8, the folder path of each target folder is described in the form of a full path, each target printer is identified by an IP address thereof, and each job ticket is identified by a file name thereof. Note that forms of information described in the job ticket management table 801 are not limited to those shown in FIG. 8, but information may be described in other forms.

When a file to be printed is dropped into a hot folder by a user, the hot folder application 302 acquires the name of the dropped folder from the operating system 311. By searching the job ticket management table 801 using the acquired folder name as a key, it is possible to acquire the target printer related to the hot folder into which the file was dropped, and the job ticket in which print properties assigned to the hot folder are described.

[Exemplary Changing of Print Properties and Cancelling of Hot Folder]

An exemplary process of changing print properties assigned to a hot folder and an exemplary process of cancelling a hot folder are described below.

FIG. 9 is a flow chart showing the exemplary process of changing a print property assigned to a hot folder. First, in step S901, a user activates the hot folder application 302 and selects an edit sheet 503 in the hot folder setting dialog sheet 501.

Figure 10:
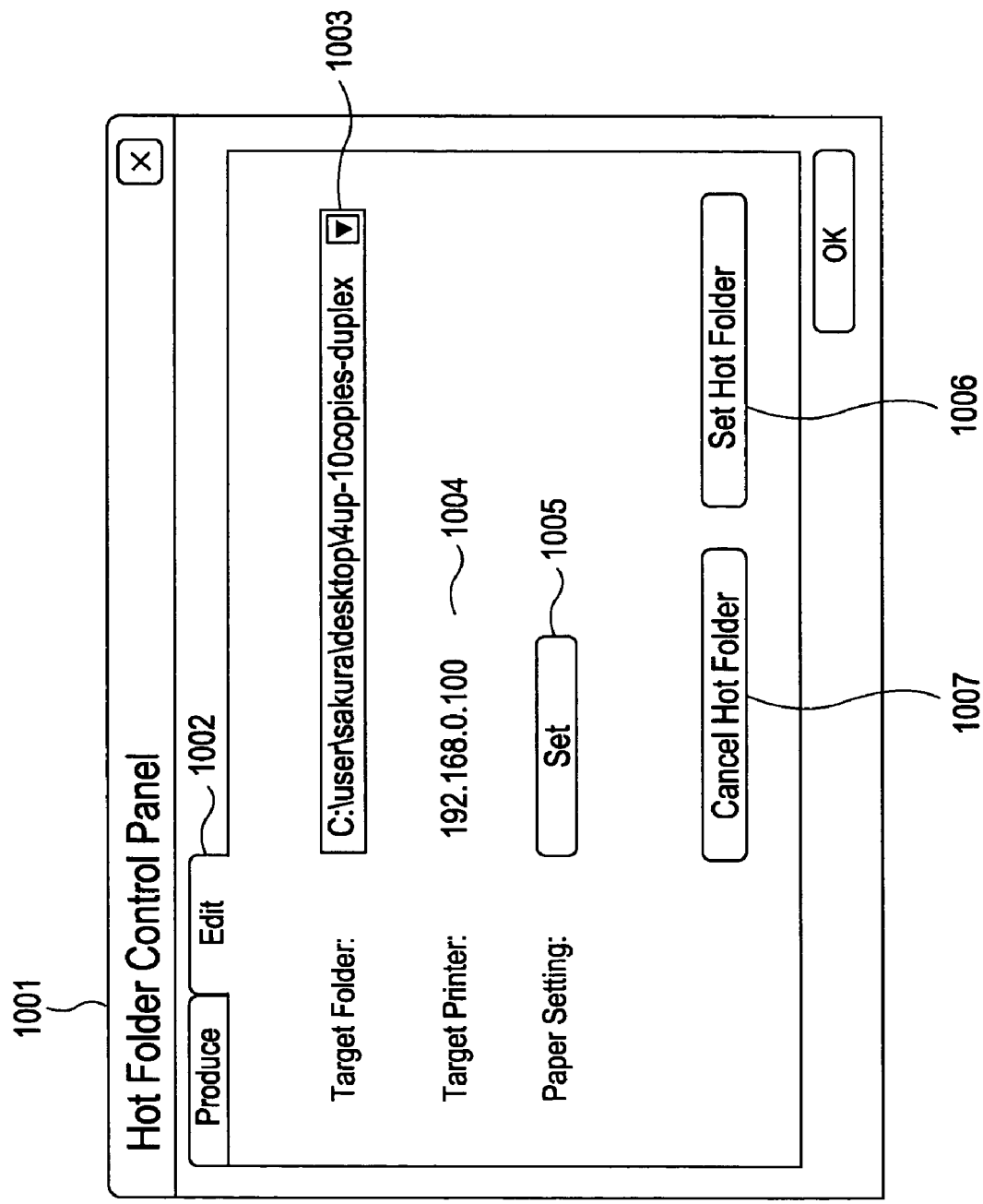
FIG. 10 shows an exemplary hot folder setting dialog sheet according to an aspect of the present embodiment.

FIG. 10 shows an exemplary edit sheet 503 (from FIG. 5) in the hot folder setting dialog 501 (from FIG. 5). Reference numeral 1001 denotes a hot folder setting dialog sheet, which is described as the setting dialog sheet 501 in FIG. 5. Reference numeral 1002 denotes an edit sheet, which is described as the edit sheet 503 in FIG. 5. Reference numeral 1003 is a control box for selecting a target hot folder to be edited. This control box is in the form of a drop-down list, in which hot folders described in the folder path fields 802 of the job ticket management table 801 are displayed. Reference numeral 1004 denotes a display field in which a target printer related to a hot folder selected in the target folder selection control box 1003. Reference numeral 1005 denotes a button for opening a print property setting dialog for setting print properties.

Referring back to FIG. 9, in step S902, the user selects a target hot folder whose print property is to be edited, from the target folder selection control box 1003. In response, the hot folder application 302 reads information associated with the target printer corresponding to the selected folder from the job ticket management table 801, and displays the information in the display field 1004.

Thereafter, in step S903, if the user clicks the "print property setting" button 1005, the print property setting dialog is opened. The print property setting dialog displayed herein and the process of setting print properties are similar to those described above with reference to FIG. 6, and thus a duplication explanation is omitted herein.

If the process of changing the print properties performed is completed, then in step S904 the user clicks the "Set Hot Folder" button 1006 in the edit sheet 1002 in the hot folder setting dialog. If the "Set Hot Folder" button 1006 is clicked by the user, the hot folder application 302 regenerates a job ticket such that changed print properties are reflected therein. The operating system 311 stores the regenerated job ticket such that the old job ticket stored in the job ticket storage area 307 is replaced with the regenerated job ticket. Furthermore, the hot folder application 302 updates the job ticket management table 801. Thus, the print properties of the hot folder have been changed. Note that in the above-described process, the hot folder application 302 does not allow print properties to be changed into invalid parameter values, in a similar manner to the hot folder creation process described above.

Figure 11:
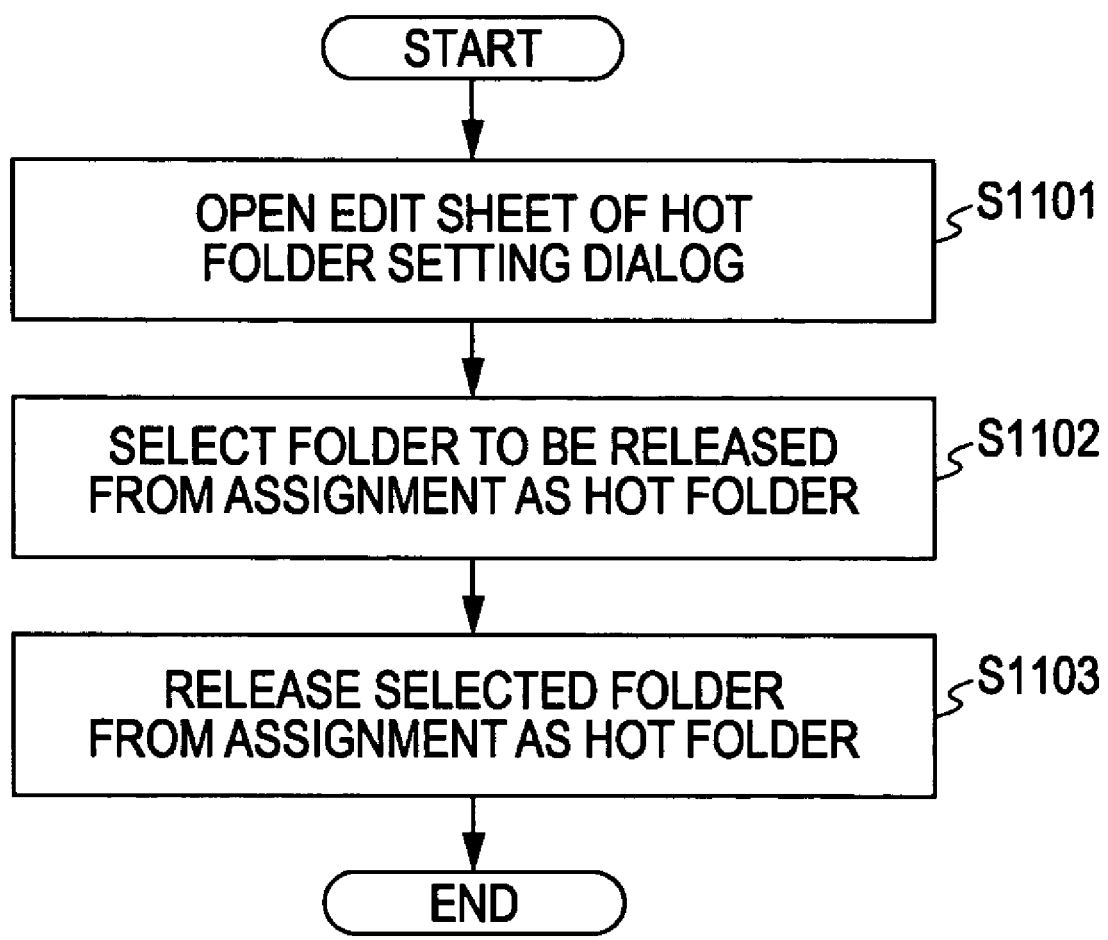
FIG. 11 is a flow chart of an exemplary canceling a hot folder according to an aspect of the present embodiment.

Now, with reference to the flow chart shown in FIG. 11, an exemplary process of canceling a hot folder is described below. First, in step S1101, a user activates the hot folder application 302 and selects the edit sheet 1002 in the hot folder setting dialog. Thereafter, in step S1102, from the target folder selection control box 1003, the user selects a folder to be released from assignment as a hot folder.

In step S1103, the user clicks the "Cancel Hot Folder" button 1007 in the edit sheet 1002 in the hot folder setting dialog. If the "Cancel Hot Folder" button 1007 is clicked, the hot folder application 302 deletes information associated with the selected hot folder from the hot folder management table 801. Thus, the process of canceling the hot folder is completed.

[Exemplary Operation of Hot Folder]

Figure 12:
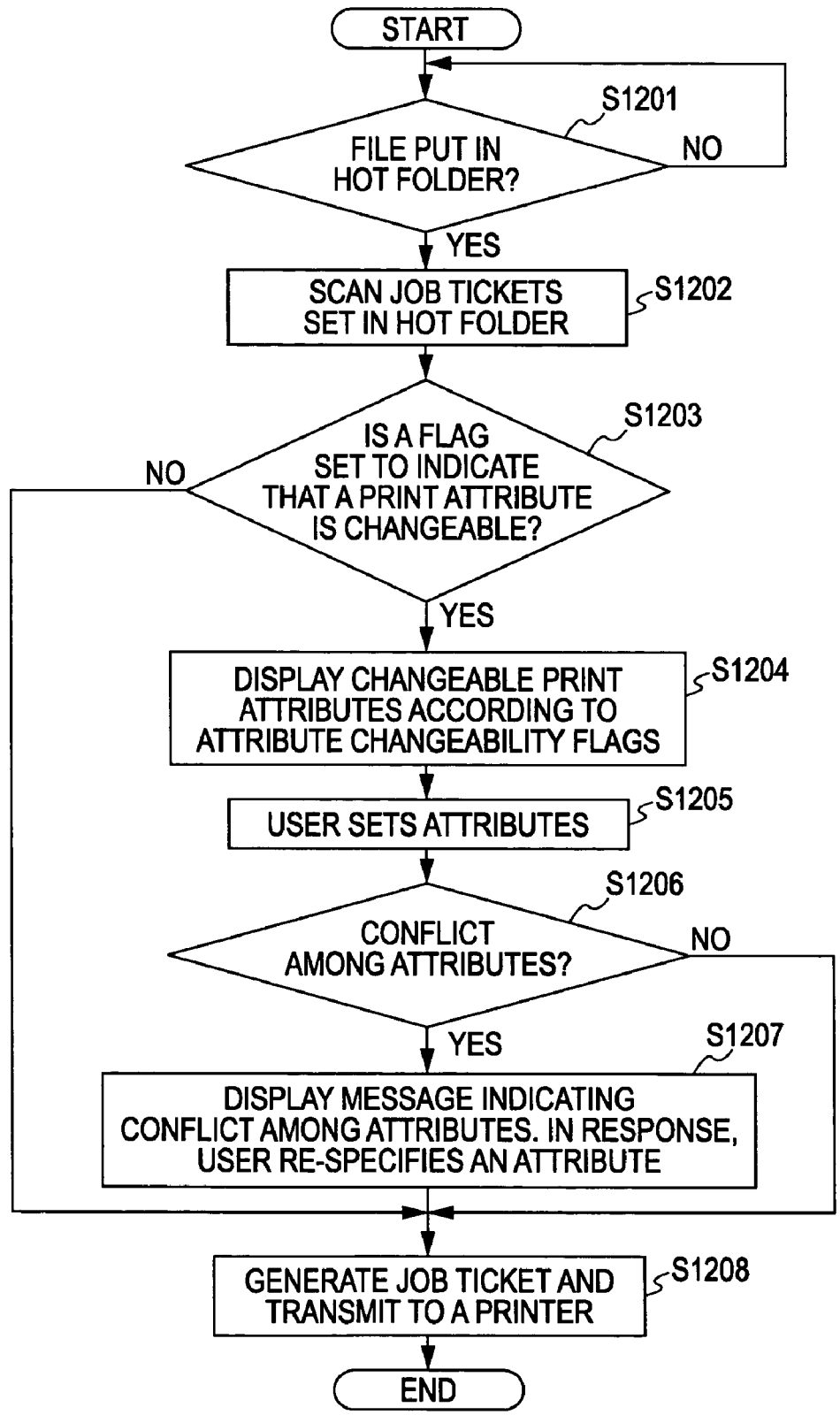
FIG. 12 is a flow chart of an exemplary printing operation using a hot folder according to an aspect of the present embodiment.

Now, an explanation is given as to an exemplary operation that is performed when a user drops a file into a hot folder created in the above-described manner. FIG. 12 shows an exemplary operation that is performed when a user drops a file into a hot folder.

In the following explanation, by way of example, it is assumed that a file is dropped into a folder that has been set as described above with reference to FIGS. 6 and 7, and the hot folder corresponds to that denoted by reference numeral 205 in FIG. 2. Furthermore, in this example, it is also assumed that when the hot folder is created, the hot folder application 302 is activated and is resident on the operating system. The operation described below is performed mainly by the hot folder application 302 resident on the operating system.

First, in step S1201, the hot folder application 302 continuously monitors whether a user drops a file into the hot folder 205. If a file to be printed is dropped into the hot folder 205 by the user, the hot folder application 302 detects that the file has been dropped into the hot folder 205, and the process proceeds to a next step.

In step S1202, the hot folder application 302 reads, from the hot folder management table 303, information associated with a target printer related to the hot folder and also reads a job ticket assigned to the hot folder. In the case in which the job ticket management table 303 is given as that shown in FIG. 8, the hot folder application 302 detects that 192.168.0.100 is a target printer related to the hot folder into which the file was dropped, and 4up-10copies-duplex.xml is a jot ticket file.

In step S1203, in accordance with the acquired the information identifying the job ticket file, the hot folder application 302 acquires the job ticket file from the job ticket storage area 307 and scans the content thereof to determine whether the job ticket has a print property changeability flag that is set as ON (<Attribute Change Flag="ON"/>).

That is, in step S1203, it is determined whether the job ticket includes a description of a print property changeability flag, and the following process is performed differently depending on whether the job ticket includes such a description. In the present example, it is assumed that the job ticket acquired and scanned by the hot folder application 302 has the content such as that shown in FIG. 7, and thus the hot folder application 302 detects that the job ticket includes print property changeability flags that are set as ON, and the process proceeds to step S1204. Note that in the above process, the hot folder application 302 also acquires information associated with print properties corresponding to the print property changeability flags that are set as ON, because the information associated with print properties is necessary to generate a print property setting dialog to be displayed in step S1204.

On the other hand, in the case in which the determination in step S1203 is that the scanned job ticket includes no print property changeability flag that is set as ON, the process proceeds to step S1208.

Figure 13:
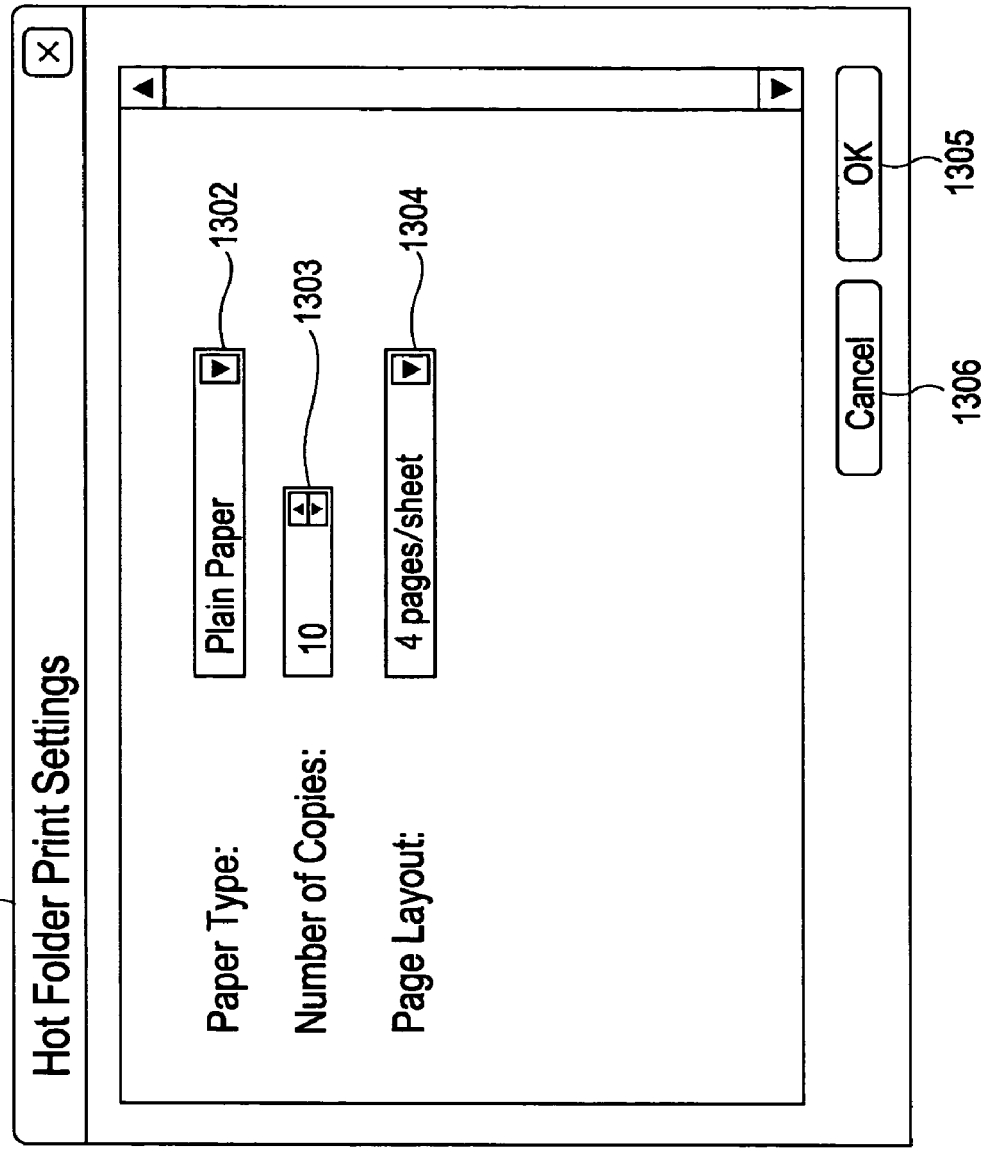
FIG. 13 shows an exemplary dialog sheet for setting a print property associated with a hot folder according to an aspect of the present embodiment.

In step S1204, the hot folder application 302 displays the print property setting dialog for setting print properties that are set as changeable in the print property changeability flags. In the specific example of the job ticket shown in FIG. 7, changeable print properties are paper type", "number of copies", and "page layout", and thus the print property setting dialog displayed herein includes control boxes for setting these three properties. FIG. 13 shows the print property setting dialog generated and displayed by the hot folder application 302. Although in the present embodiment, the hot folder application 302 generates the print property setting dialog when a file is dropped into the hot folder 205 and step S1203 is completed, the present invention does not have a particular restriction on the timing of generating the print property setting dialog. At the time at which the creating of the hot folder is completed, print properties assigned to the hot folder are already known, and thus it is possible to generate the print property setting dialog at any time thereafter and it is possible to display the print property setting dialog as required.

FIG. 13 shows the print property setting dialog 1301 displayed in step S1204. Reference numeral 1302 denotes a paper type setting control box, reference numeral 1303 denotes a control box for setting the number of copies, and reference numeral 1304 denotes a page layout setting control box. In these control boxes, values that were specified when the hot folder was created are displayed as default values. The user can change these values as required.

That is, the user changes print properties as required using this dialog. For example, the number of copies is set to a proper value. After the print properties are properly set, the user clicks the OK button 1305 to start printing. To cancel the printing, the user clicks the cancel button 1306. If the cancel button 1306 is clicked, the printing process is completely cancelled. That is, it is regarded that no file has dropped into the hot folder. To perform printing according to the default print properties displayed in the print property setting dialog, the OK button is directly clicked without changing any print property. Herein it may be assumed that the user changes the paper type from plain paper to thick paper, and the number of copies from 10 to 1. Also, it may also be assumed that the currently specified target printer has not the capability of printing on thick paper.

If the user clicks the OK button, the hot folder application 302 determines whether any change has been made in the changeable print properties via the print property setting dialog 1301. The hot folder application 302 stores data indicating the specified print properties in an arbitrary storage area (step S1205).

Thereafter, in step S1206, the hot folder application 302 determines whether printing is possible according to the print properties specified by the user. More specifically, the hot folder application 302 checks whether the print properties changed in step S1205 by the user have no conflict with other print properties and have valid values. For example, this checking process can be performed in a similar manner to the hot folder creating process.

In the present example, the user has changed the paper type from plain paper to thick paper via the print property setting dialog shown in FIG. 13. However, the target printer currently assigned to the hot folder does have the capability of printing on the thick paper in the double-sided (duplex) mode. In such as case, that is, when it is impossible to perform printing in accordance with the specified print properties, the process proceeds to step S1207 to reset the print properties. On the other hand, if the print properties are all valid, the process proceeds to step S1208.

Figure 14:
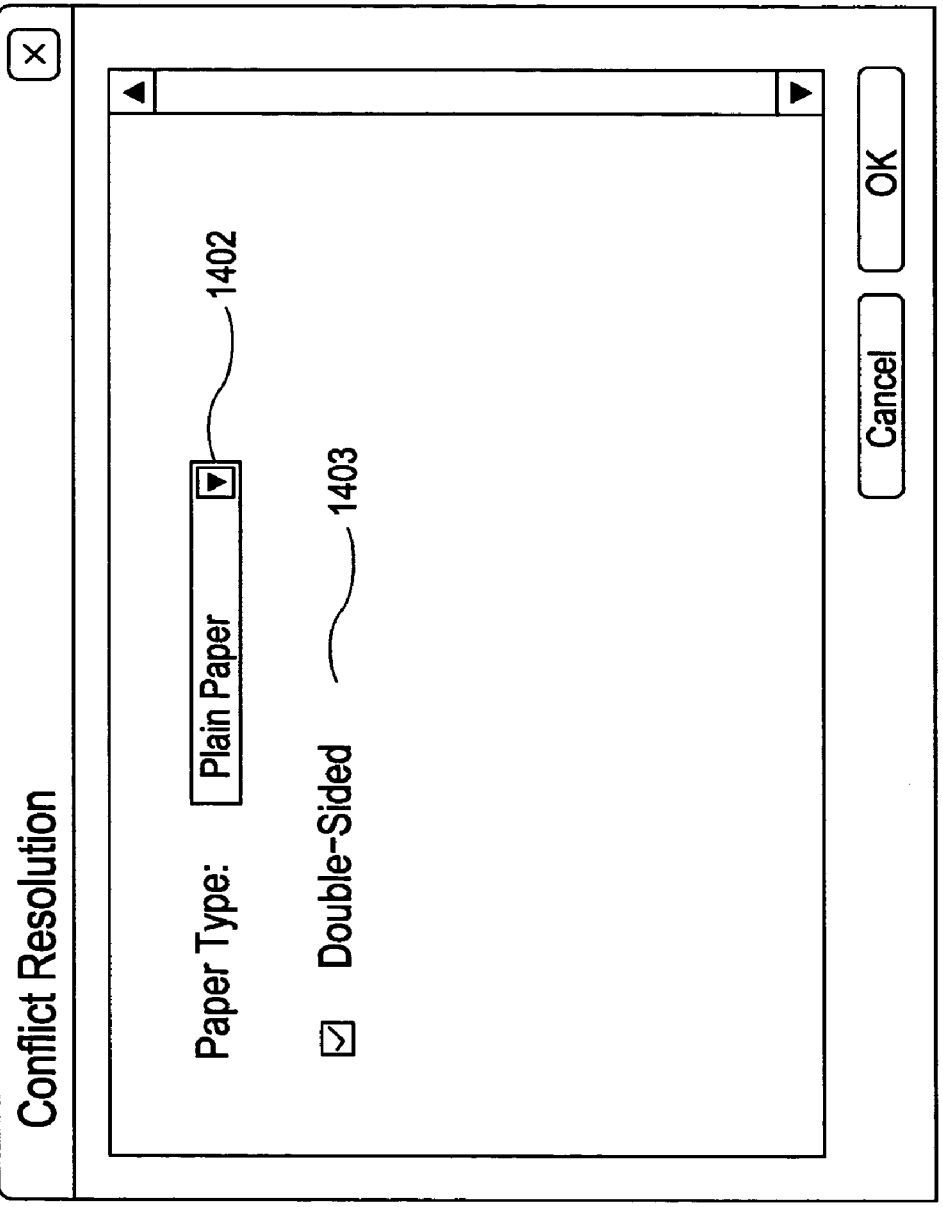
FIG. 14 shows an exemplary dialog sheet for resetting a print property according to a second embodiment of the present invention.

In step S1207, the hot folder application 302 displays a warning dialog (not shown) to notify the user that it is impossible to perform printing according to the specified print properties. Furthermore, the hot folder application 302 displays a print property setting dialog to allow the user to perform resetting of the print properties. FIG. 14 shows the print property dialog 1401 for performing the resetting of the print properties. Reference numeral 1402 denotes a control box for setting the paper type, and reference numeral 1403 denotes a control box for specifying the double-sided mode. Although not shown in FIG. 14, information indicating why printing is impossible may also be displayed. For example, a message "The target printer does not have the capability of performing printing on thick paper in the double-sided mode" is displayed. On the print property setting dialog 1401, the user may change the paper type to plain paper or may change the double-sided mode to the single-sided mode or otherwise may change both properties (the paper type is changed to plain paper and the double-sided mode to the single-sided mode) to resolve the conflict among he print properties.

Thereafter, in step S1208, the hot folder application 302 regenerates a job ticket. That is, in a case in which some print property has been changed in step S1205 or S1207, a job ticket is regenerated. In this regeneration process, a new job ticket may be generated and the old job ticket stored in the job ticket storage area 307 may be replaced with the newly generated job ticket, or only changed print properties in the job ticket acquired in step S1302 may be rewritten. Note that the present invention has no particular restriction on the manner of regenerating a job ticket as long as changed print properties are reflected in the resultant job ticket. Note that the process of producing such a job ticket is referred to as the regeneration process. In the job ticket regenerated in step S1208, it is not necessarily needed to describe property changeability flags, because property changeability flags are not necessary in the following process.

The job ticket generated in the above-described manner is transmitted, together with print data dropped into the hot folder, to the printer from the job generation/transmission controller 305 via the operating system.

As described above, when printing is performed using a hot folder, a user can change an arbitrary print property to a new value from a value that was set when the hot folder was created, without creating an error. That is, the present embodiment of the invention makes it possible to easily manage a large number of hot folders to which different print properties are assigned, and great convenience is provided by use of such hot folders.

Second Exemplary Embodiment

In the second embodiment, an exemplary technique of setting a hot folder using a printer driver is disclosed. The following discussion is focused on a difference from the first embodiment, and similar processing steps to those of the first embodiment are not described. In the first embodiment, a hot folder is created by the hot folder application, and changing of print properties assigned to the hot folder is controlled. In the second embodiment, unlike the first embodiment, print properties are set by the printer driver, and a hot folder is created by the printer driver according to the print properties. Note that changing of print properties assigned to a hot folder created by the printer driver is controlled in a similar manner to the first embodiment.

[Brief Description of Operation of Printer Driver]

Figure 15:
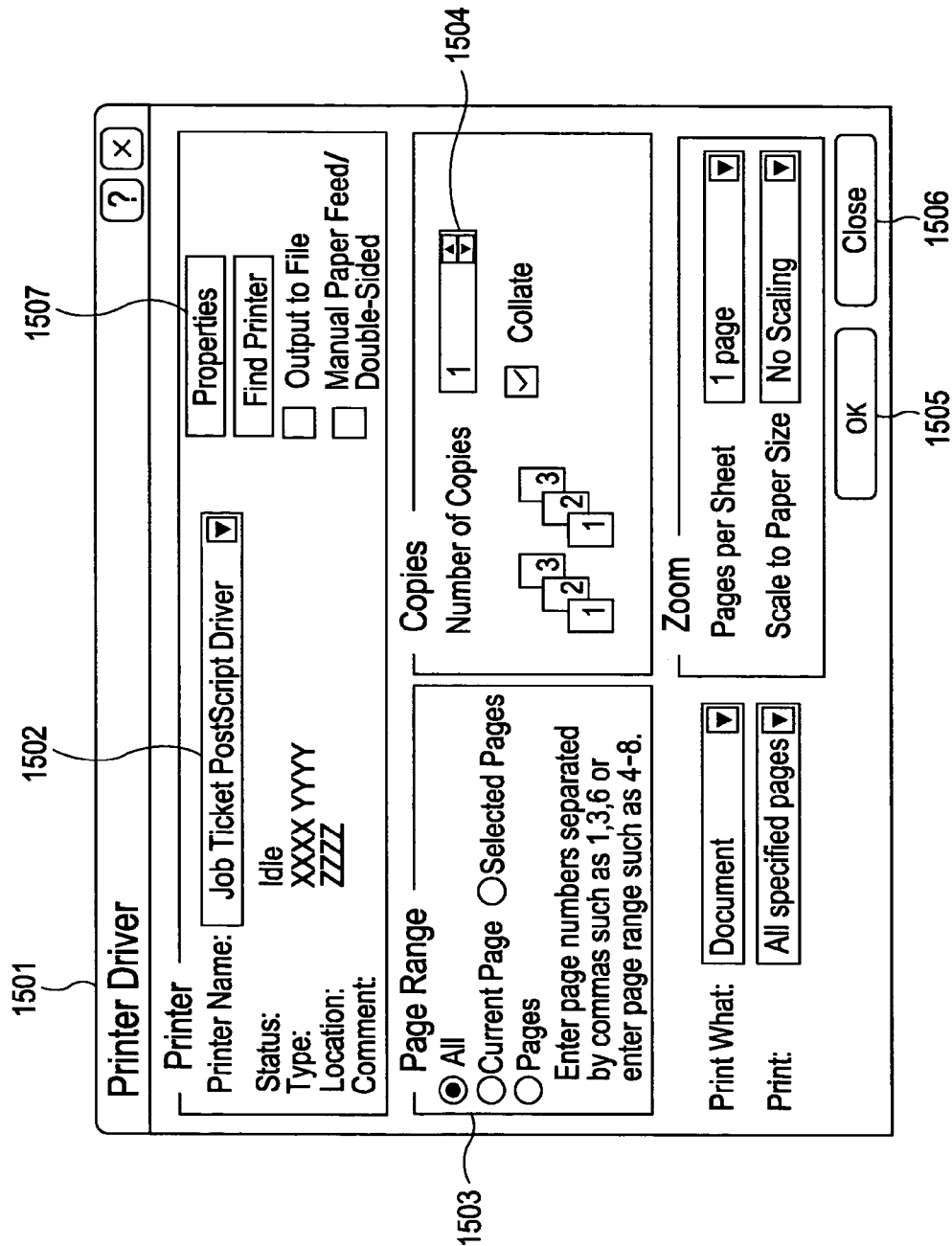
FIG. 15 shows an exemplary printer driver setting dialog sheet according to an aspect of the present embodiment.
Figure 16:
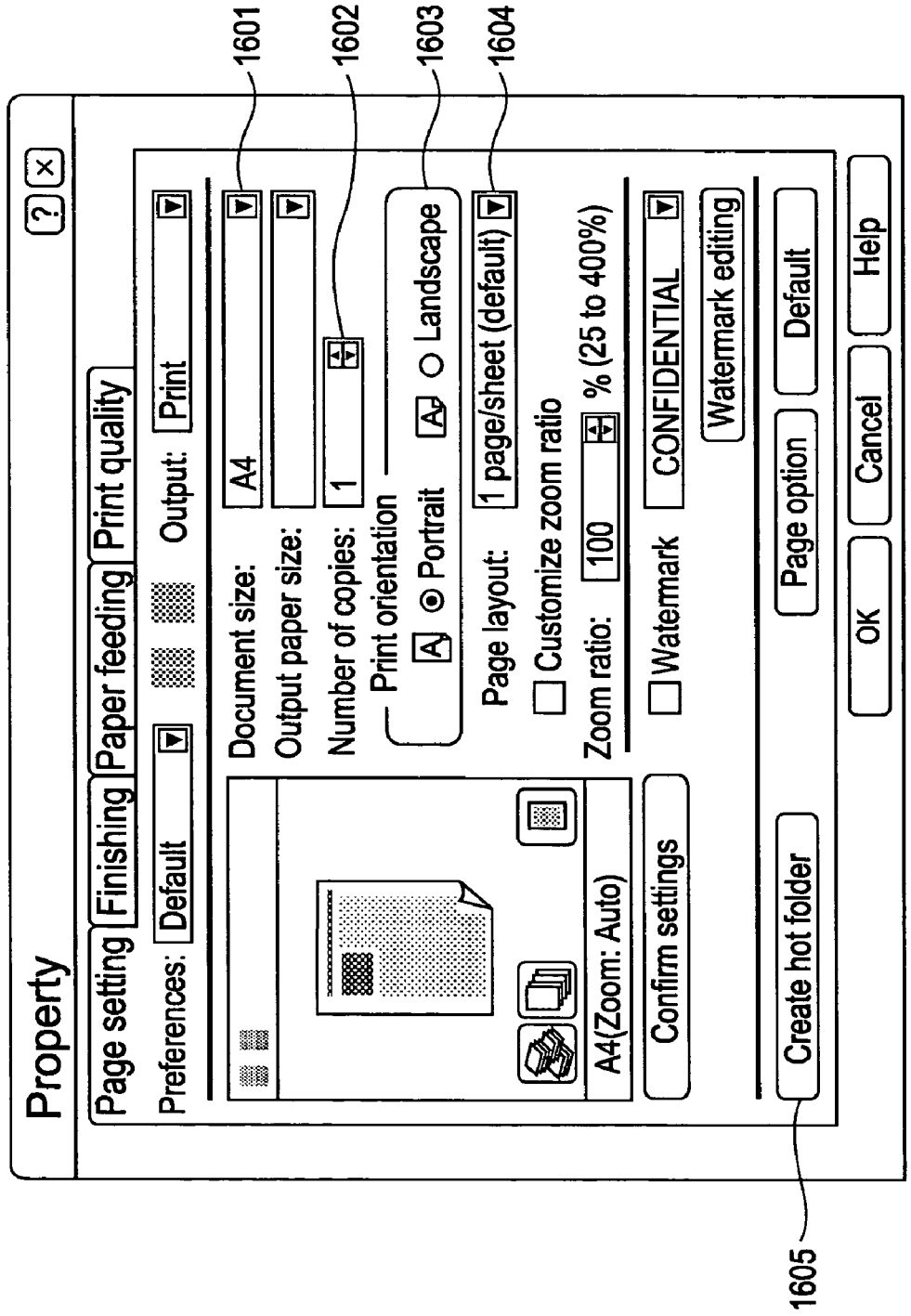
FIG. 16 shows an exemplary dialog sheet for setting a printer driver in terms of a page property according to an aspect of the present embodiment.
Figure 17:
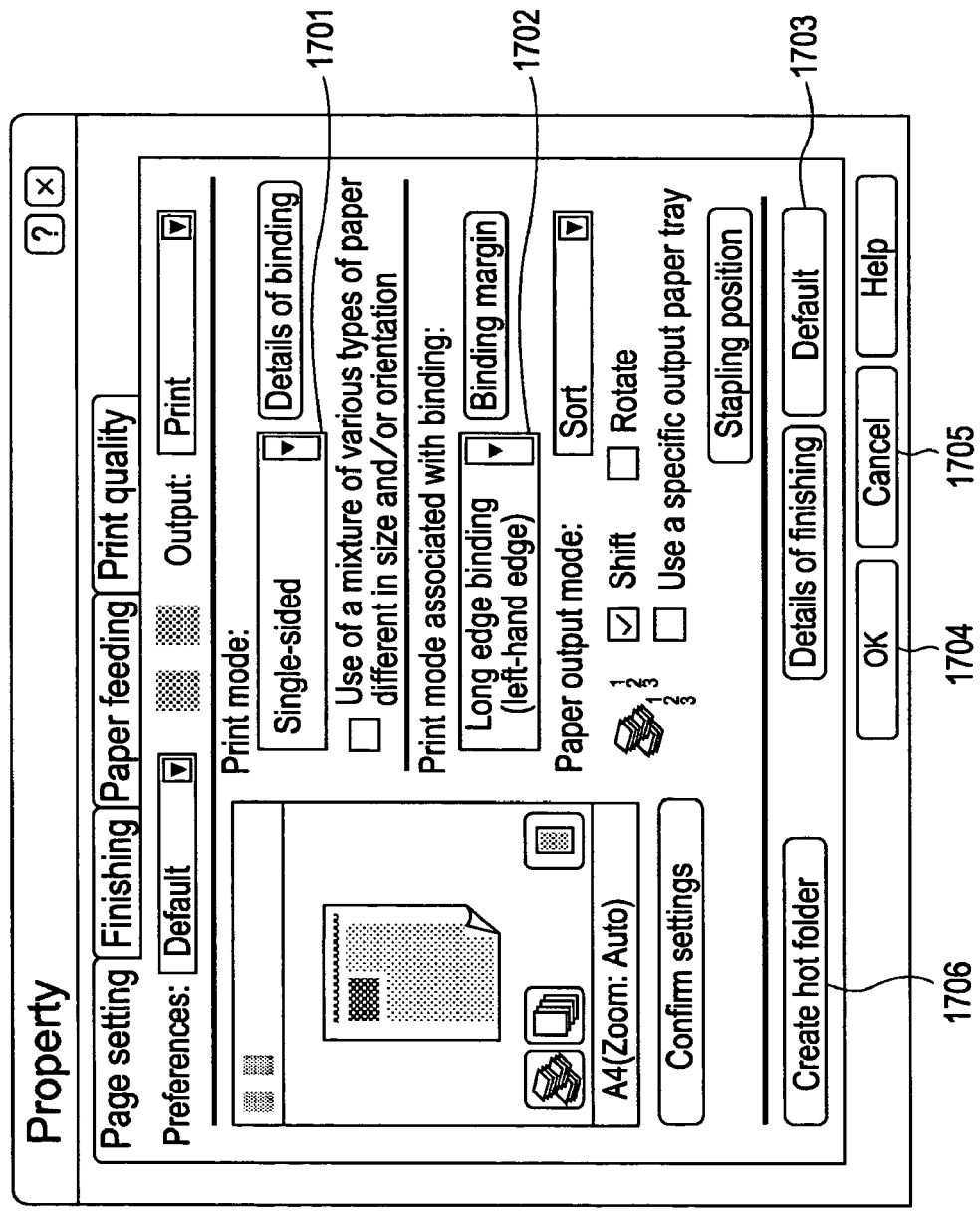
FIG. 17 shows an exemplary dialog sheet for setting a printer driver in terms of finishing according to an aspect of the present embodiment.

FIGS. 15 to 17 show examples of printer driver setting screens. The printer driver provides a GUI (Graphic User Interface) that allows a user to specify conditions of a printing operation using an image formation apparatus such as a printer. This GUI is displayed on the display of the computer when the user clicks a "Printer property" key on a print setting GUI that is displayed on the display of the computer when the user clicks a print command key on an operation screen of an application. The user is allowed to make settings of various parameters (printing conditions) via this GUI. The printer driver transmits data indicating the specified print conditions to the transmission destination (also called the output destination) such as the printer together with image data to be printed.

In FIG. 15, reference numeral 1501 denotes a printer driver setting window. In this printer driver setting window 1501, a box 1502 is used to specify a target destination to which data is transmitted. A user is allowed to specify a desired output device via the selection box 1502. A page setting box 1503 is for specifying pages to be output. Using this page setting box 1503, the user is allowed to specify which pages of a document produced using application software running on a client computer should be output. That is, using the page setting box 1503 displayed on the screen, the user can specify pages to be output by the printer. All pages may be specified or only particular pages may be specified to be printed.

A box 1504 is used to specify the number of copies of a job to be output by the printer or the like. A property button 1507 is used to make more detailed settings in terms of the destination device selected in the target device selection box 1502. If this property button 1507 is clicked by the user, a setting screen such as that shown in FIG. 16 or 17 is displayed on the display of the computer to allow the user to make detailed settings.

After setting via the setting screens shown in FIGS. 15 to 17 is completed, if an OK button 1505 is clicked, printing is started in accordance with the settings made by the user. If a cancel button 1506 is clicked, printing is cancelled, and the screen 1501 is closed.

FIGS. 16 and 17 show examples of setting screens (GUI) that are displayed on the screen of the client computer when the property button 1507 on the setting screen shown in FIG. 15 is clicked by the user. Each of the aforementioned screens has a "Page setting" tab key, a "Finishing" tab key, "Paper feed" tab key, and a "Print quality" tab key. If one of these tab key is clicked (using a pointing device (not shown) or the like of the client computer), a "Page setting" sheet, a "Finishing" setting sheet, a "Paper feed" setting sheet, or a "Print quality" setting sheet appears depending on which tab key is clicked, thereby allowing the user to make detailed settings. Also, although not shown in figures, the user is allowed to make settings in terms of resolution, halftone, etc, using a setting screen that appears when the "Print quality" tab key is clicked.

FIG. 16 shows an example of a setting screen that appears when the "Page setting" tab key is clicked. This screen includes a page size setting box 1601 that allows the user to specify the page size of paper to be used in the printing job. A page layout setting box 1604 is used to specify a layout mode in which a plurality of pages of document data are printed on each sheet of paper. A setting box 1603 is used to specify an orientation of paper. A setting box 1602 is used to specify the number of copies.

FIG. 17 shows an exemplary setting screen that appears when the "Finishing" setting tab key is clicked by the user. On this setting screen, the user is allowed to make settings in terms of items, for example, stapling, specific to the printer. Reference numeral 1701 denotes a pull-down menu for selecting a print mode. For example, this pull down menu 1701 includes selectable print modes such as single-sided printing, double-sided printing and bookbinding printing. Reference numeral 1702 denotes a pull-down menu for selecting a print mode associated with binding. For example, this pull-down menu 1702 includes selectable modes such as long edge binding (left-hand edge), long edge binding (right-hand edge), short edge binding (header edge) and long edge binding (footer edge). Reference numeral 1703 denotes a default setting button. If an OK key 1704 is clicked, the settings of properties are applied, and the screen shown in FIG. 15 appears again. If a cancel key 1705 is clicked, properties are cancelled, and the screen shown in FIG. 15 appears again.

After printing conditions including detailed properties specified in the above-described setting screens shown in FIGS. 15 to 17 are set, the client computer transmits a job output request together with print condition data of the job and image data of the job.

[Exemplary Configuration of Printer Driver]

Figure 18:
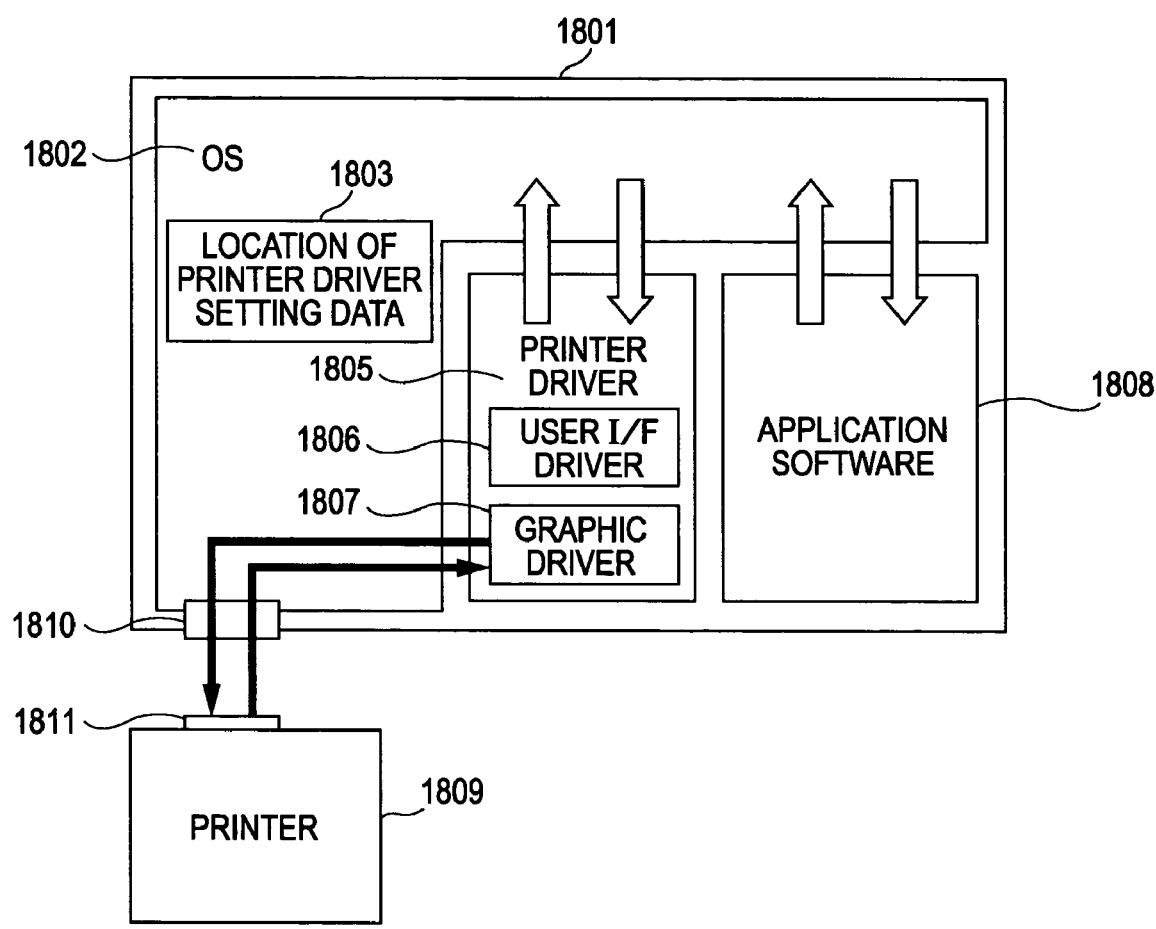
FIG. 18 is a diagram showing exemplary modules of a printer driver according to an aspect of the present embodiment.

FIG. 18 shows an exemplary internal software configuration, including a printer driver, of a client computer. An operating system (OS) 1802 is installed on a client computer 1801. A printer driver 1805 and application software 1808 are installed on the OS 1802. They are controlled by the OS 1802. The application software 1808 includes an application module corresponding to the hot folder application 302 shown in FIG. 3.

The printer driver 1801 includes a user interface driver 1806 responsible for displaying and storing setting data, and also includes a graphic driver 1807 that converts a print command given by the application via the OS into a code that can be interpreted by the printer. When a print property setting command is given to the user interface driver 1806 by the application via the OS, the user interface driver 1806 displays one of print property setting dialogs or the property sheet shown in FIGS. 15 to 17.

The OS has a storage area 1803 for storing setting data associated with the printer driver. The print properties set by the user via the user interface driver 1806 are stored in this printer driver setting data storage area 1803. The user interface driver 1806, the graphic driver 1807, and the application software 1808, are allowed to access the printer driver setting data storage area 1803 via the OS to read the print properties set by the user.

A communication interface 1810 of the client computer is connected to a communication interface 1811 of the printer 1809 via a communication medium such as a network. The graphic driver 1807 is capable of transmitting print data to the printer via the OS, and is also capable of acquiring information indicating the configuration and/of the status of the printer via the OS.

[Exemplary Flow of Printing Operation]

Figure 19:
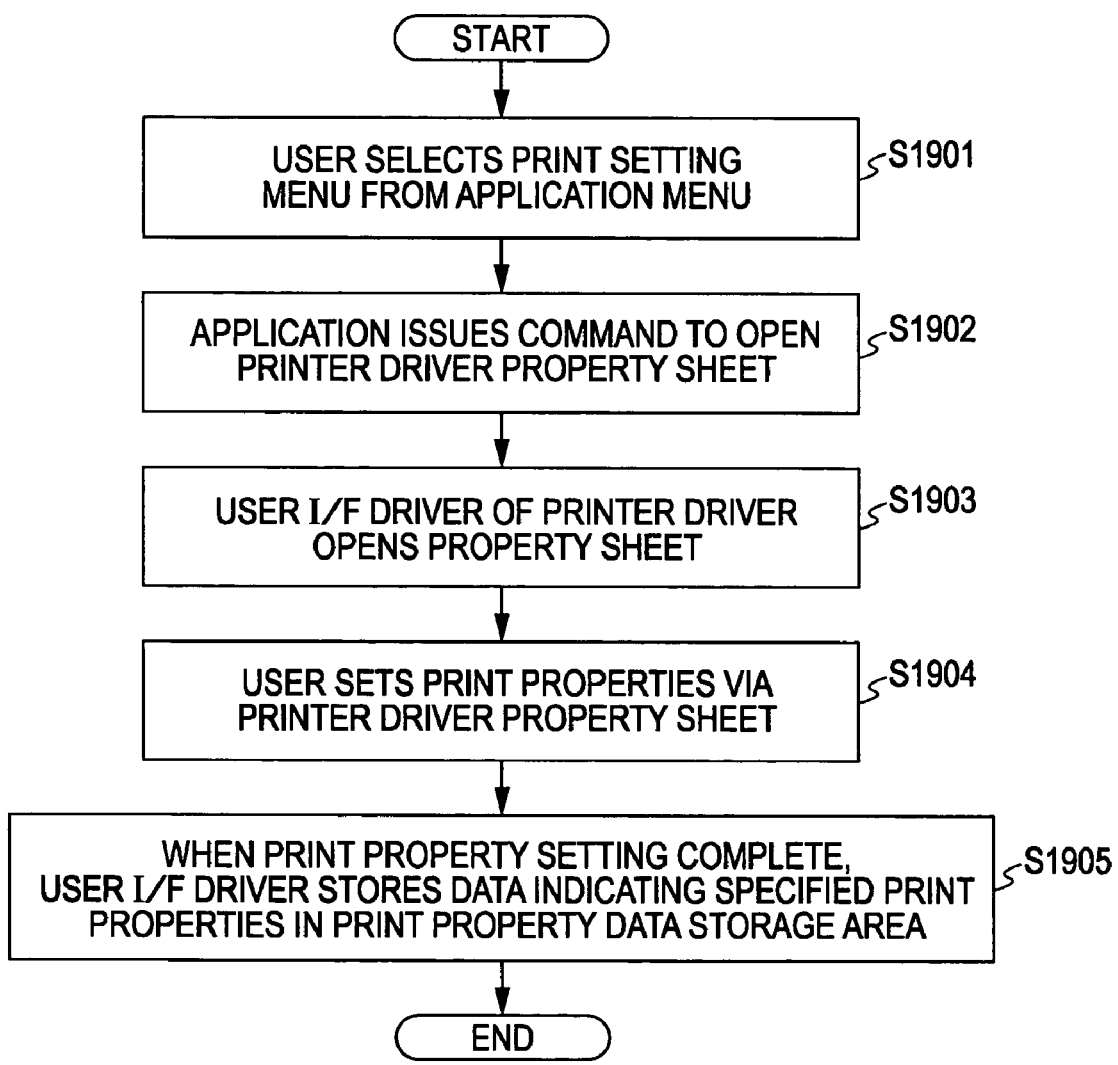
FIG. 19 is a flow chart of an exemplary process of setting a printer driver in terms of print properties according to an aspect of the present embodiment.

A flow of an exemplary printing operation from a step performed by a user to set print properties on the printer driver to a step of performing printing is described below. FIG. 19 is a flow chart showing an exemplary process performed by a user to set print properties, and FIG. 20 is a flow chart showing an exemplary process of performing printing in accordance with a print command issued by the user.

Referring to FIG. 19, first, in step S1901, the user selects a print property setting menu from an application software menu. In response, in step S1902, the application calls an API (Application Programming Interface) of the OS to command the printer driver to display a print property setting sheet. In accordance with this command, the OS issues a command to the printer driver to display the print property setting sheet. In step S1903, in accordance with this command, the user interface driver of the printer driver displays the print property setting sheet shown in FIG. 15.

Thereafter, in step S1904, the user sets print properties via the proper sheet shown in FIG. 15 or other sheets shown in FIGS. 16 to 17. After the settings are completed, if the user clicks the OK button 1505 on the property sheet shown in FIG. 15, the specified print properties are applied. If the OK button 1505 is clicked, then in step S1905, the user interface driver 1806 calls the API of the OS to store data indicating the print properties specified by the user into the printer driver setting data storage area 1803 in the OS. Thus, setting of print properties and storing of setting data are completed.

Referring to FIG. 20, in step 2001, to print a document, the user selects a print menu from the application software menu. In step S2002, in response to the print menu selection command, the application software calls the API of the OS to issue a print start command to the printer driver. As required, the print property setting dialog shown in FIG. 15 may be displayed in the above-described process. In response, the OS issues the print start command to the printer driver.

In step S2003, in response to the print start command, the graphic driver of the printer driver reads print properties from the printer driver setting data storage area of the OS and generates a print property setting code according to the print properties. The resultant print property setting code is transmitted to the printer.

Thereafter, in step S2004, the application software requests the OS to generate a print command in accordance with the document data. In step S2005, in response to the request from the application software, the OS transmits the print command to the graphic driver 1807. The graphic driver 1807 generates, from the received print command, a print code in a form that can be interpreted by the printer, and transmits the resultant print code to the printer. In step S2006, the printer performs rendering based on the received print code and performs printing. Thus, printing is performed in accordance with the print properties specified by the user.

[Exemplary Creation of Hot Folder]

An exemplary process of creating a hot folder on the printer driver is described below. FIG. 21 shows a flow of this process. First, in step S2101, on the property sheet of the printer driver, a user properly sets print properties for a hot folder to be created. Then in step S2102, on one of property sheets or on the sheet shown in FIG. 16 or 17, the user clicks the "Create Hot Folder" button (1605 or 1706) to open a hot folder property setting dialog sheet. On this setting dialog sheet, the user makes settings associated with the target folder and specifies attribute items to be set to be changeable, in step S2103. This dialog sheet is similar to that described above with reference to FIG. 5 except that there is no control box for specifying the target printer, and thus an explanation thereof is omitted herein. Note that a printer selected in the selection box 1502 on the sheet shown in FIG. 15 is employed as the target printer. Also, when a file is dropped into the hot folder, if there is a property to be changed, a dialog similar to that shown in FIG. 6 is displayed to allow the user to change the property.

The printer driver generates a job ticket according to the specified properties. After the job ticket is generated, the control is transferred to the hot folder application. The job ticket generated by the printer driver is similar to that described above with reference to FIG. 7, and thus a further detailed explanation is omitted herein.

FIG. 22 shows the relationship between the printer driver and the hot folder application. The printer driver 2203 and the hot folder application 2204 are installed on the operating system 2202 installed on the client computer 2201. The OS 2202 may also include a printer driver setting data storage area 2209 and a job ticket storage area 2210.

The printer driver 2203 and the hot folder application 2204 can communicate with each other. The printer driver 2203 includes an external communication controller 2205 and an export function 2207. Similarly, the hot folder application 2204 includes an external communication controller 2206 and an export function 2208. This configuration makes it possible for the printer driver 2203 and the hot folder application 2204 to transmit/receive a command or data in a predetermined data format to/from each other according to a predetermined procedure.

Using this mechanism, the printer driver 2203 transmits, to the hot folder application 2204, a hot folder creation command together with the job ticket shown in FIG. 7, information associated with the target folder, and information associated with the target printer, to create a hot folder with the print properties described in the job ticket. After the printer driver 2203 transmits the target folder, the target printer, and the job ticket to the hot folder application 2204, the hot folder application 2204 performs a process similar to that according to the first embodiment, and thus a duplicated explanation thereof is omitted herein.

In the present embodiment, as described above, print properties are set when a hot driver is created on the printer driver, and the print properties are allowed to be changed when a file is dropped into the hot folder.

Third Exemplary Embodiment

In this third embodiment, a process of making settings associated with a hot folder using a print property wizard is disclosed. The following discussion will be focused on differences from the first embodiment or the second embodiment, and similar processing steps to those of the first embodiment or the second embodiment are not described.

In the first embodiment, the process of creating a hot folder using a hot folder application and the process of controlling changing of print properties related to the hot folder are disclosed. In the second embodiment, the process of creating a hot folder using a printer driver is disclosed. In the third embodiment, unlike the first or second embodiment, print properties are set using a print setting wizard, and a hot folder is created by a printer driver in accordance with the specified print properties. Note that changing of print properties assigned to a hot folder created using the print property setting wizard is controlled in a similar manner to the first embodiment.

In the second embodiment described above, when a document is printed, print properties are specified using the property sheet of the printer driver. In this third embodiment, instead, a user is allowed to interactively make settings associated with print properties via a setting sheet provided by the print property setting wizard, and a hot folder is created according to the specified print properties, as described below. Note that the print property setting wizard may be provided by a printer driver or a dedicated application. In the following discussion, it is assumed that the print property setting wizard is provided by a printer driver.

[Process of Creating Hot Folder Using Wizard]

FIG. 23 is a flow chart of an exemplary process of setting print properties, creating a hot folder, and performing printing, using a wizard. With reference to this flow chart, the process of creating a hot folder is described below. First, a user starts setting of print properties via a wizard provided by a printer driver. In the following discussion, it is assumed that properties for printing in a binding mode are set.

Figure 24:
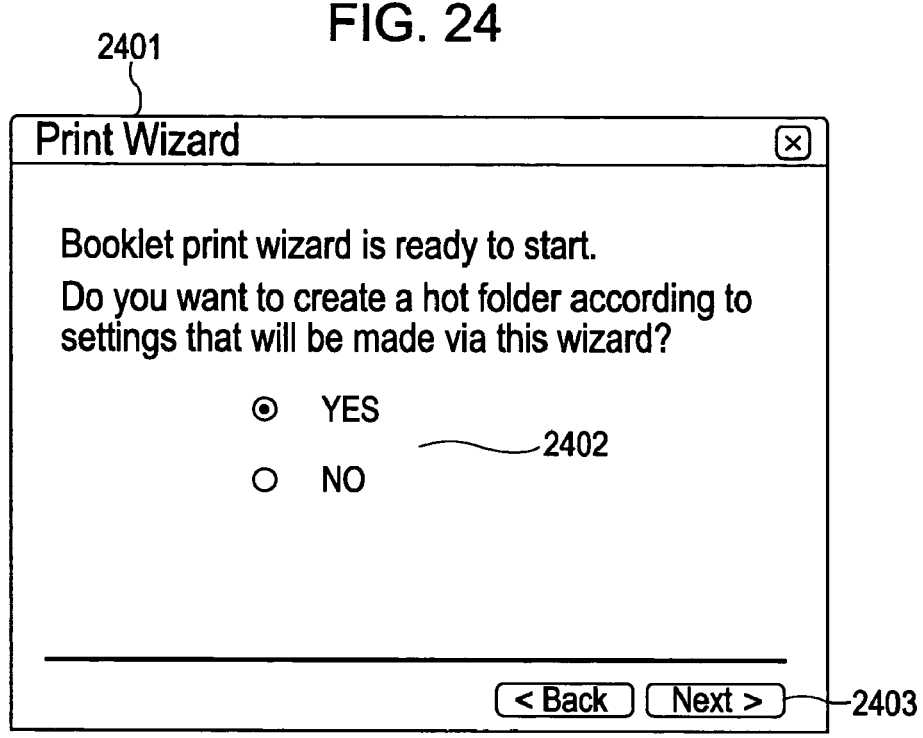
FIG. 24 shows an exemplary wizard start dialog sheet according to an aspect of the present embodiment.

In step S2301, before print properties are set, the user selects whether to create a hot folder to which print properties, which are going to be set via the print property setting wizard, are related. FIG. 24 shows an example of a dialog sheet that is displayed to allow the user to make the selection. The user selects whether to create a hot folder by checking one of radio buttons 2402. If the user selects a "No" radio button 2402, then in step S2302, setting of print properties and printing are performed in a normal mode. However, if the user selects a "Yes" radio button 2402, step S2303 and steps following that are performed to create a hot folder.

Referring back to FIG. 23, when setting of print properties using the wizard is started in step S2303, a selection is made as to whether check boxes for selecting whether properties should be changeable or not are also included in dialog sheets that will be displayed in following steps.

Figure 25:
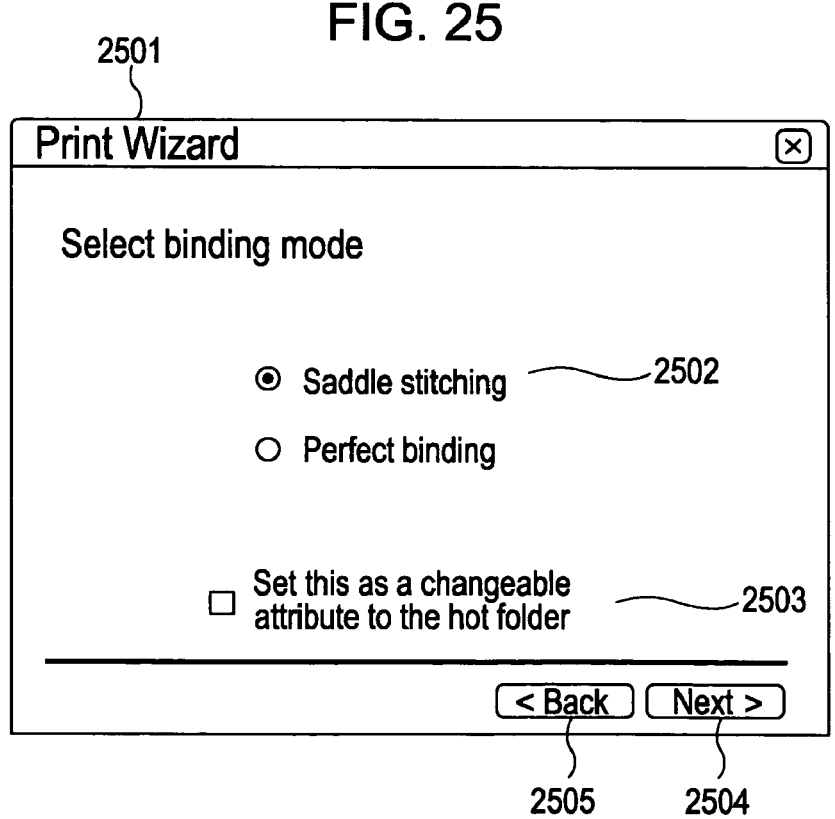
FIG. 25 shows an exemplary wizard dialog sheet for specifying a binding mode according to an aspect of the present embodiment.

FIGS. 25 to 27 show exemplary dialog sheets provided by the print property setting wizard. FIG. 25 shows an exemplary dialog sheet for selecting a binding mode. On this dialog sheet, the user is allowed to select a saddle stitching mode or a perfect binding mode. FIG. 26 shows an exemplary dialog sheet 2601 for selecting a paper type, and FIG. 27 shows an exemplary dialog sheet 2701 for specifying the number of copies. In the specific example of the dialog sheet 2501 shown in FIG. 25, the saddle stitching mode 2502 is selected, and the binding mode is set as an unchangeable property. That is, in this example shown in FIG. 25, a check box 2503 for specifying the changeability is unchecked. In the example of the dialog sheet 2601 shown in FIG. 26, plain paper is selected as the paper type 2602, and the paper type is set as a changeable property by checking a changeability check box 2603.

In the example of the dialog sheet 2701 shown in FIG. 27, the number of copies is set to 10 (see reference numeral 2702), and a changeability check box 2703 is checked to allow the number of copies to be changed. It is possible to switch among property sheets shown in FIGS. 24 to 28. If a "Next" button (2403, 2504, 2604, or 2704) is clicked, a next dialog sheet appears. On the other hand, if a "Back" button (2505, 2605, 2705, or 2805) is clicked, a previous dialog sheet appears.

Figures 28, 29:
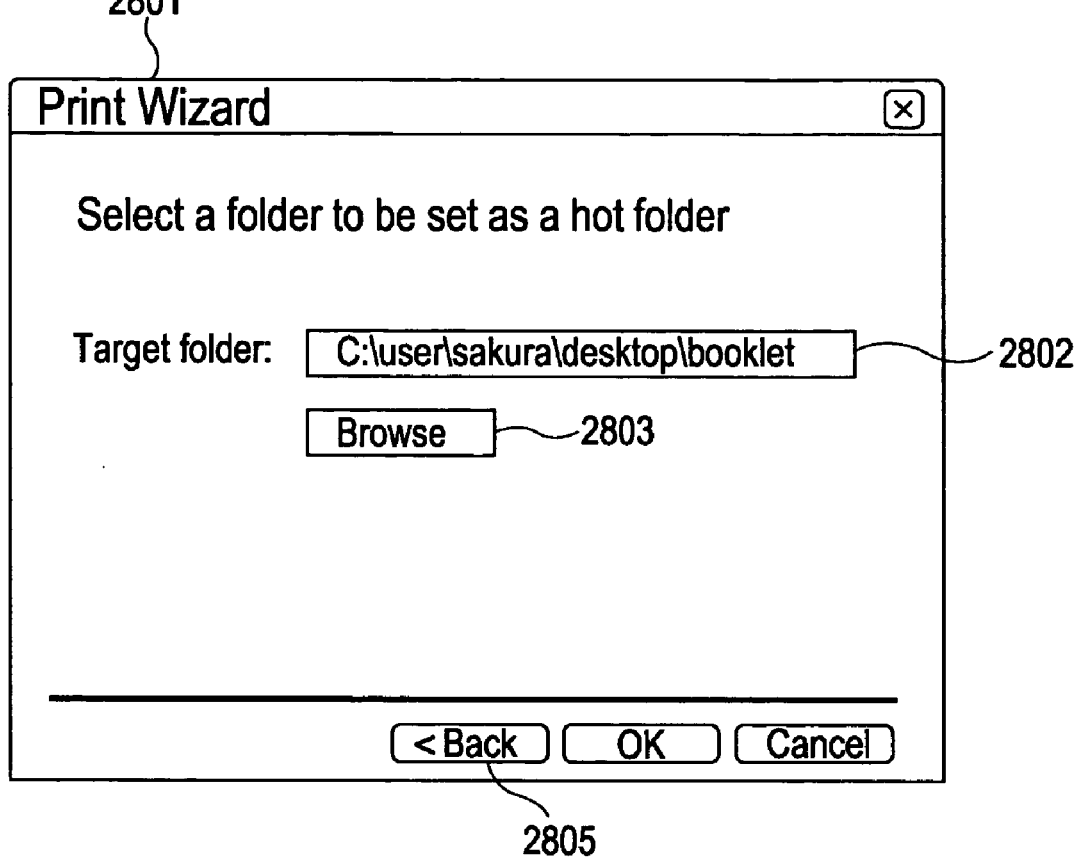
FIG. 28 shows an exemplary wizard dialog sheet for specifying a hot folder according to an aspect of the present embodiment.
FIG. 29 shows an exemplary job ticket associated with a hot folder according to an aspect of the present embodiment.

Referring back to FIG. 23, after the setting of print properties using the wizard is completed, settings associated with the hot folder are made in the next step S2304. FIG. 28 shows an exemplary dialog sheet 2801 for making settings associated with the hot folder. In the example shown in FIG. 28, a target folder is specified in a box 2802. Instead of directly specifying a path of the target folder in the box 2802, a target folder may be selected from a list that appears when a browse button 2803 is clicked. This dialog sheet does not have control boxes for specifying a target printer and print properties, because the target printer is specified by the printer driver, and print properties specified in previous steps are used.

Referring back to FIG. 23, in step S2305, the printer driver generates a job ticket related to the hot folder. FIG. 29 shows an example of a job ticket. In this example of the job ticket, "A4" is selected as the output size 2901, the saddle stitch mode is specified as the binding mode in rows 2902, plain paper is changeably specified as the paper type in row 2903, and the number of copies is changeably specified as 10 (see reference numeral 2904).

Referring back to FIG. 23 again, in step S2306, the printer driver transmits data indicating the path of the hot folder, data indicating the target printer, and the job ticket to the hot folder application. The transmission is performed in a similar manner as described above with reference to FIG. 22 (in the second embodiment), and thus an explanation thereof is omitted herein. In step S2307, the hot folder application makes settings associated with the hot folder based on the received data indicating the path of the hot folder, the target printer, and the job ticket. This setting process is similar to that described above in the first embodiment, and thus an explanation thereof is omitted herein.

[Exemplary Operation of Hot Folder]

An exemplary hot folder operation performed when a file is dropped into the hot folder by a user is described below with reference to a flow chart shown in FIG. 30. In this embodiment, unlike the first or second embodiment, when a file is dropped into the hot folder, all changeable properties are not displayed at a time, but changeable properties are displayed one by one in wizard setting sheets, although all changeable properties may be displayed at a time.

Figure 30:
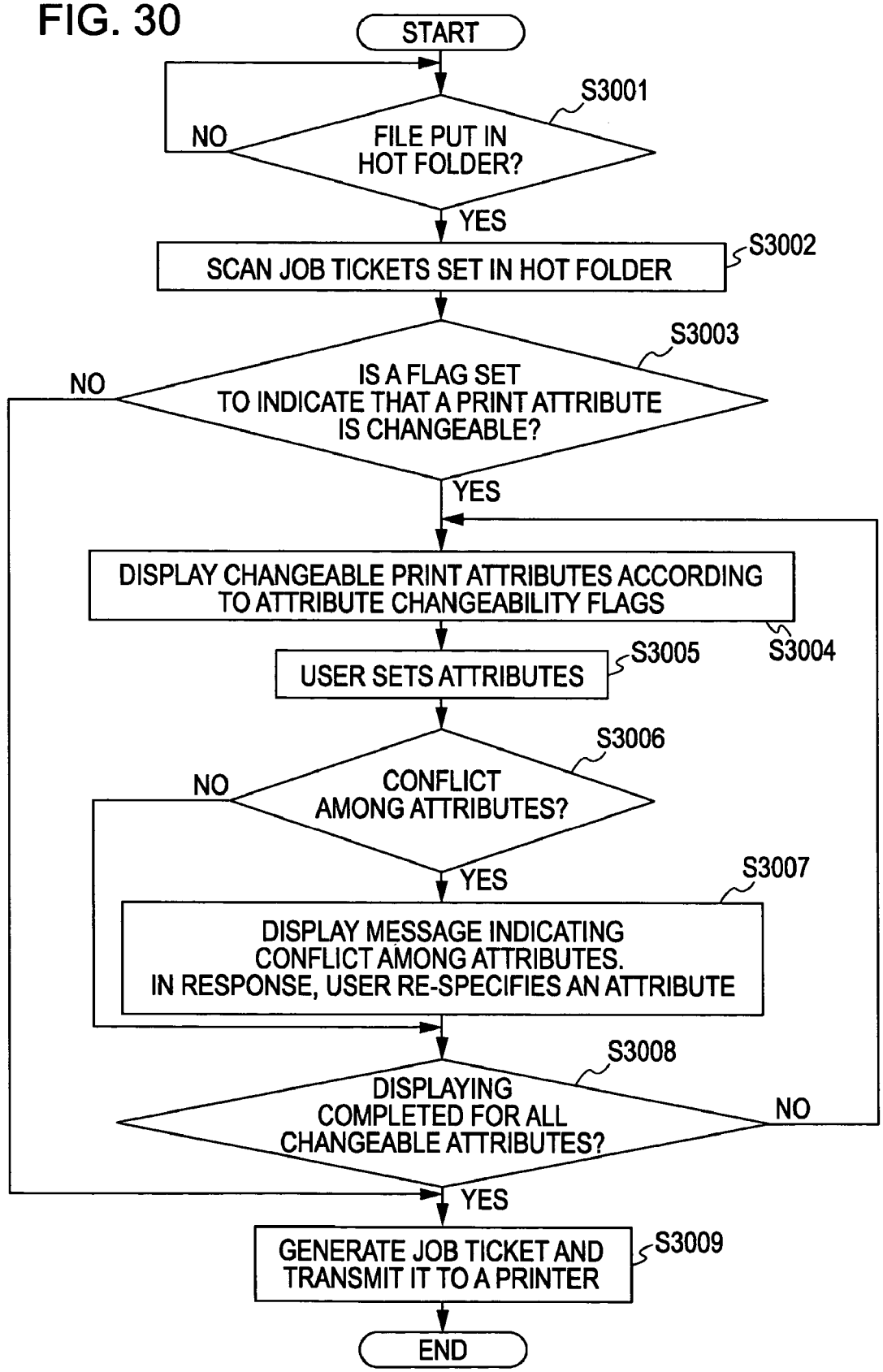
FIG. 30 is a flow chart of an exemplary printing operation using a hot folder according to an aspect of the present embodiment.
Figure 31:
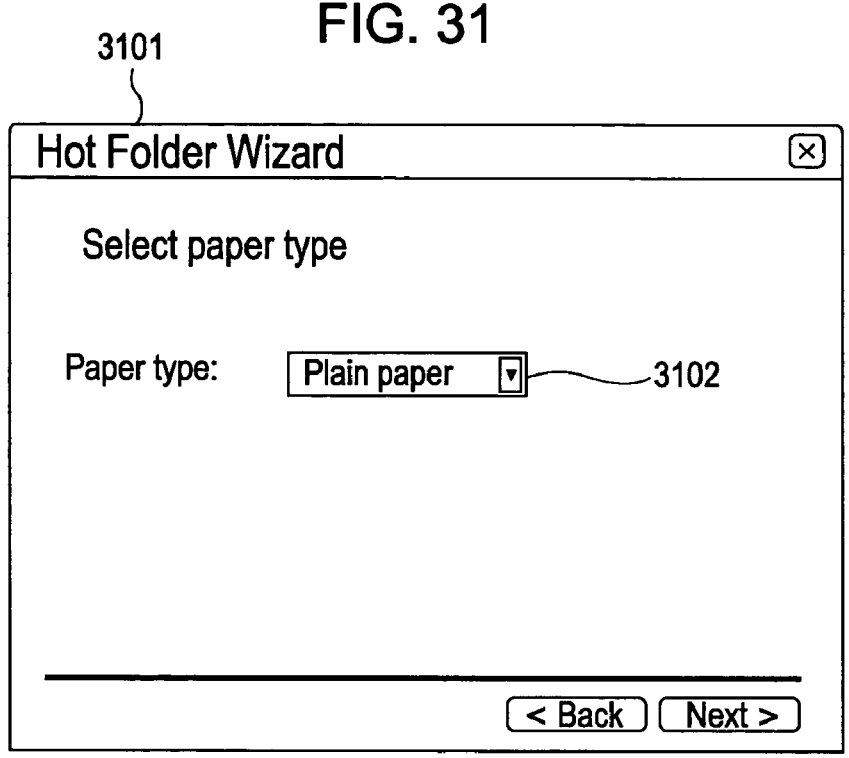
FIG. 31 shows an exemplary wizard dialog sheet for specifying a paper type according to an aspect of the present embodiment.

Referring to FIG. 30, steps S3001 to 3003 are similar to steps S1201 to S1203 in the first embodiment, and thus an explanation thereof is omitted herein. In step S3004, a property specified as changeable by a changeability flag is displayed on a wizard setting dialog. From the job ticket shown in FIG. 29, it is detected that a first changeable property is the paper type, and thus a wizard setting dialog 3101 for setting the paper type 3102 is displayed as shown in FIG. 31. If the paper type is specified in step S3005 by the user, then in step S3006, a determination is made as to whether the specified parameter value is valid, that is, whether printing is possible according to the specified parameter value. If the specified parameter value is invalid, then in step S3007, the user resets the property to a valid value in a similar manner to the first embodiment described above.

Figure 32:
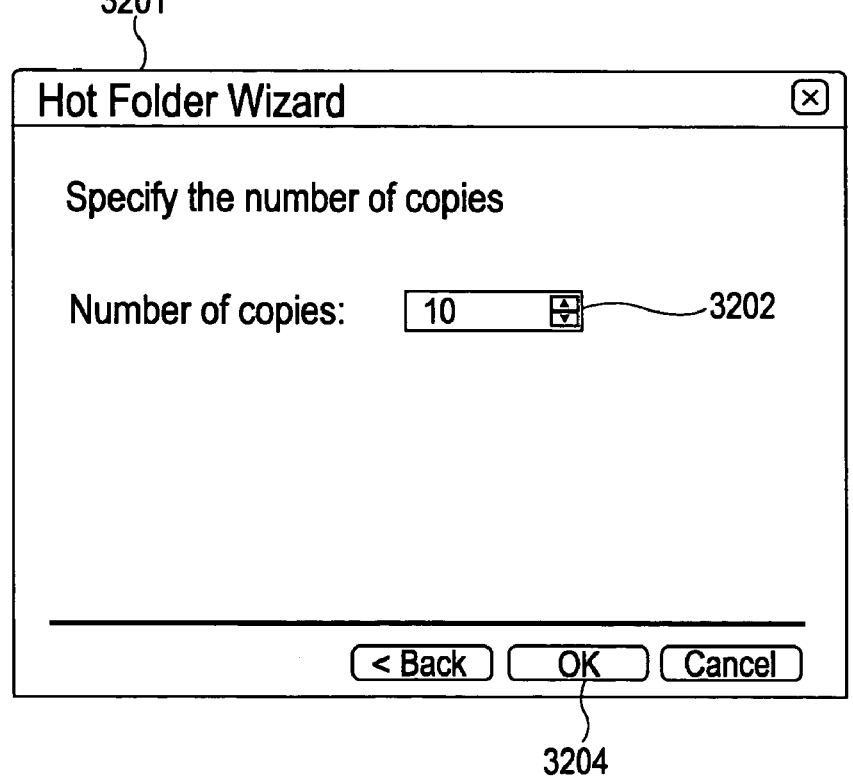
FIG. 32 shows an exemplary wizard dialog sheet for specifying the number of copied according to an aspect of the present embodiment.

In step S3008, it is determined whether wizard setting dialogs have been displayed for all changeable properties. In this specific case, the job ticket shown in FIG. 29 indicates that the number of copies is set as changeable in rows 2904, and thus the process returns to S3004 to display a wizard setting dialog for setting the number of copies. FIG. 32 shows an example of the wizard setting dialog 3201 for this purpose. In this specific example, it is assumed that the number of copies is changed to 3 (see reference numeral 3202). If the number of copies is specified, the setting of changeable properties is completed, and thus an OK button 3204 is displayed on the dialog shown in FIG. 32. If the user clicks the OK button 3204, then in step S3009, a job ticket is generated or updated, and the resultant job ticket is transmitted to the printer.

In the present embodiment, as described above, a hot folder is created via the print property setting wizard provided by the printer driver, and a user is allowed to change printer properties assigned to the hot folder if they are set as changeable.

Fourth Exemplary Embodiment

In this fourth embodiment, a system is disclosed which is similar to that shown in FIG. 1 according to the first embodiment but which is different from the first embodiment that a hot folder is allowed to be located not only on a client computer but also on a printer.

[Exemplary System]

Figure 33:
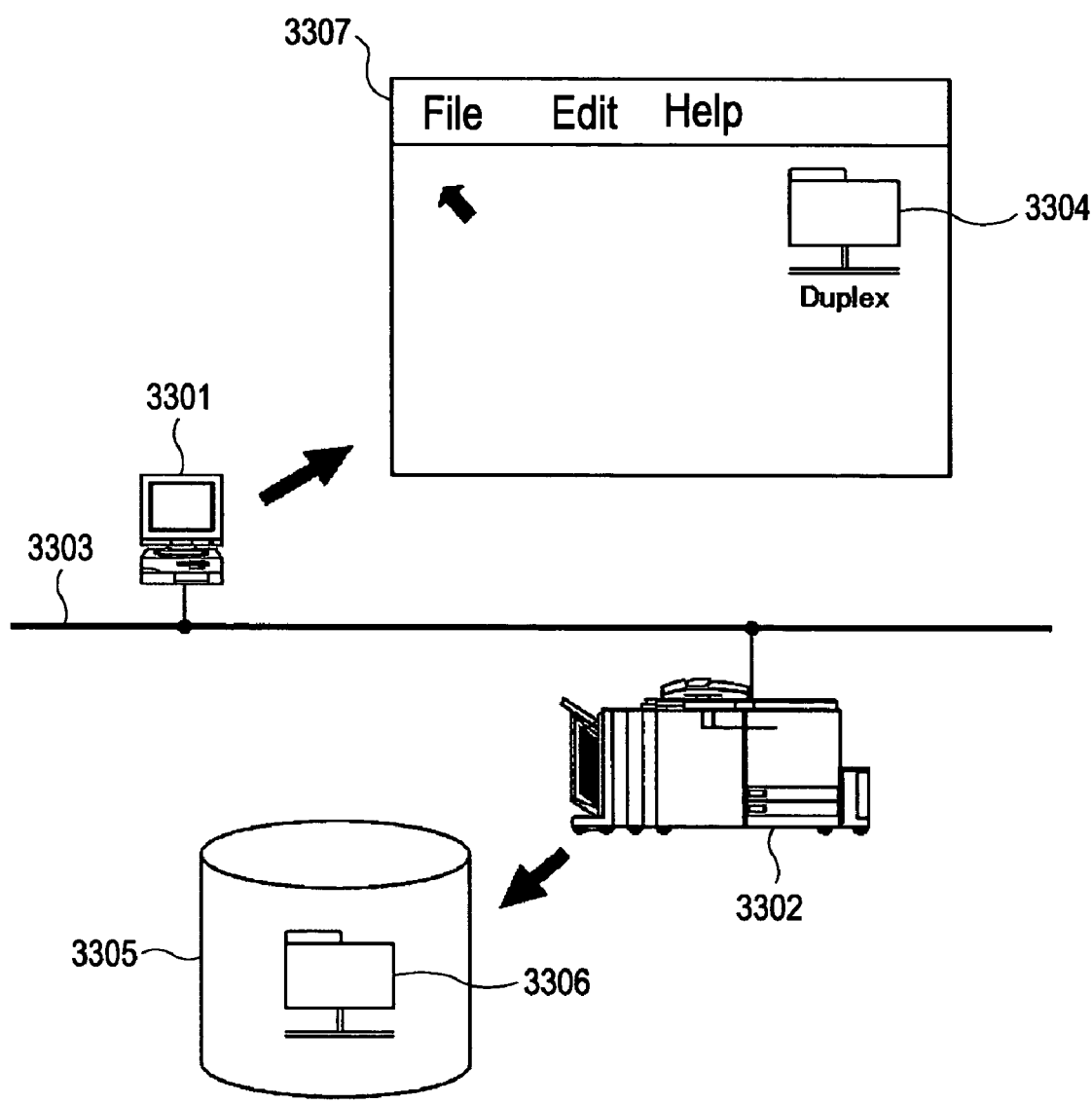
FIG. 33 shows an example of a configuration of a hot folder system according to a third embodiment of the present invention.

FIG. 33 shows an exemplary system configuration including a client computer 3301 and a network printer 3302. In the first to third embodiments described above, hot folders are located on the client computer 3301. In this fourth embodiment, hot folders are also allowed to be located on the printer 3302, and users are allowed to access hot folders located on the printer 3302 via a network. If a user drops a file into a directly in which print properties of a hot folder are described, printing is performed in accordance with these print properties.

In FIG. 33, reference numeral 3305 denotes a file system of the printer 3302, and reference numeral 3306 denotes a particular directly that is allowed to access for the above purpose. Dropping of a file into this directly may be performed via a computer network 3303 serving as a communication medium using a file transfer protocol such as FTP (File Transfer Protocol) or SMB (Server Message Block). For instance, SMB is used as a standard protocol to achieve file sharing or printer sharing on Microsoft Windows or the like. In UNIX, an application called Samba is used to achieve SMB. The client computer 3301 is allowed to create a hot folder in the accessible folder in the printer 3302. Reference numeral 3307 denotes a desktop screen of the client computer 3301. In this specific example of the desktop screen 3307 shown in FIG. 33, the directly 3306 on the printer 3302 is accessed and an icon 3304 indicating the directly 3306 is displayed on the desktop screen 3307. If a document file to be printed is dragged and dropped into the icon 3304 of the hot folder 3306 on the desktop screen 3307 using a mouse or the like, printing is performed according to the print properties assigned to the hot folder 3306. The internal structure of the printer 3302, and the flow of the printing process performed by the printer 3302 are described below.

[Exemplary Configuration of Printer]

Figure 34:
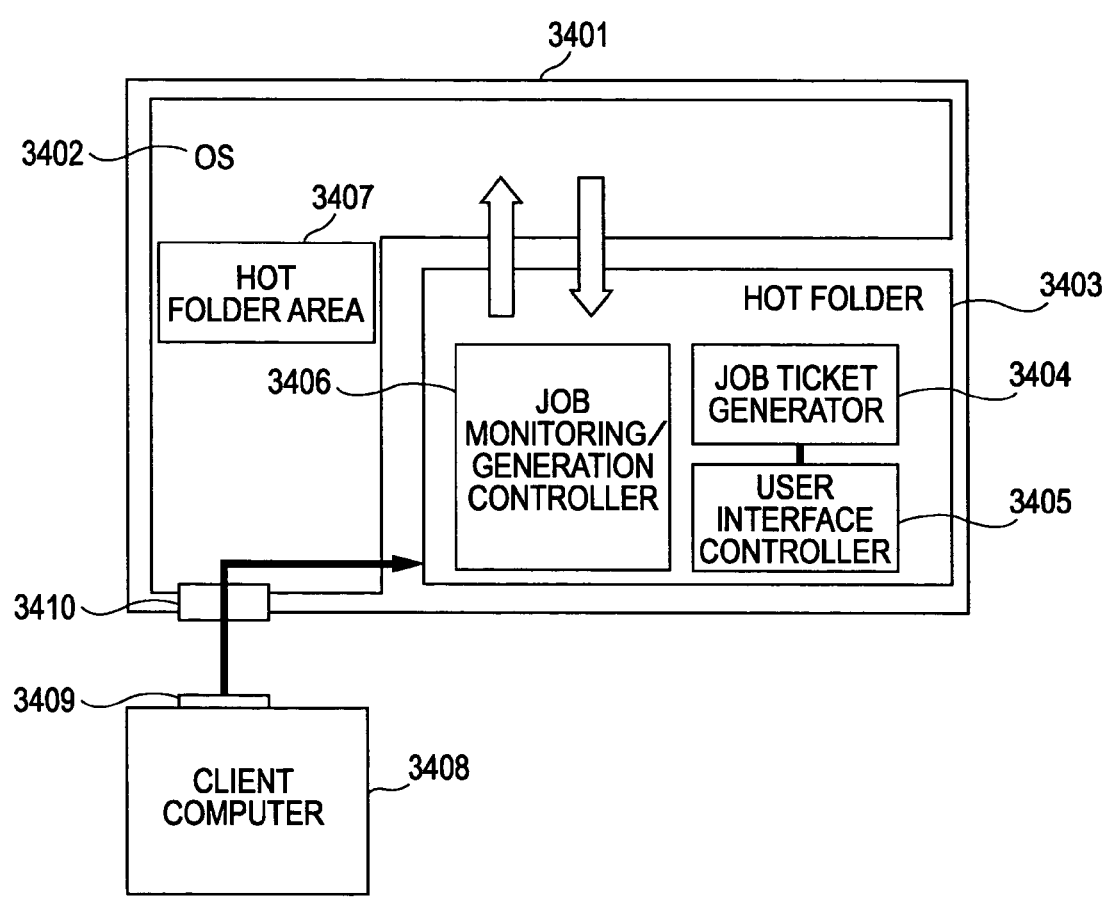
FIG. 34 shows an exemplary internal structure of a printer according to an aspect of the present embodiment.

FIG. 34 shows an exemplary internal configuration 3401 of the printer 3302. An operating system 3402 for controlling a basic operation of the printer 3302 is installed on the printer 3302, and a hot folder application 3403 is installed on the operating system 3402. The hot folder application 3403 includes a job monitoring/generation controller 3406 that determines whether a file has been dropped into a hot folder area 3407 allocated in a storage area managed by the operating system 3402 and that generates a job if a dropped file is detected. A user interface controller 3405 controls a user interface via which print properties related to a hot folder are set. The hot folder application 3403 also includes a job ticket generator 3404 for generating a job ticket. Receiving of a document file from the client computer 3408 is performed via a communication medium located between a network interface 3409 of the client computer 3408 and a network interface 3410 of the printer 3302.

The property setting process performed by the user interface controller 3405 of the printer 3302 and the job ticket generation process performed by the job ticket generator 3404 are similar to those performed by the hot folder application on the client computer 3301 according to previous embodiments, and thus explanations thereof are omitted.

Figure 35:
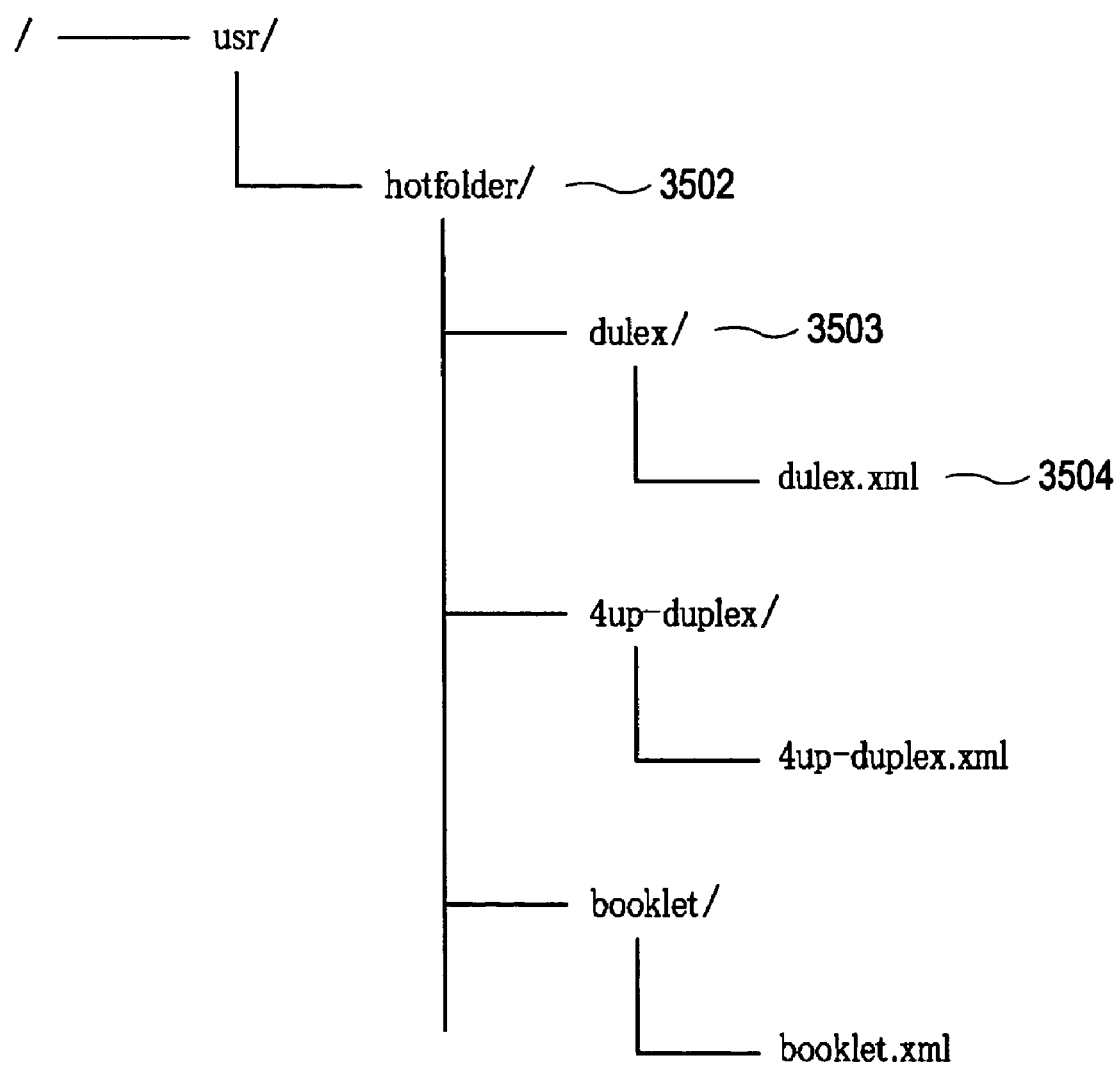
FIG. 35 shows an example of a directory structure of a hot folder according to an aspect of the present embodiment.

FIG. 35 shows an exemplary structure of the hot folder area 3407. Hot folders are created separately for respective sets of print properties in directories below a directory "/usr/hotfolder" 3502. For example, in a hot folder with a path "/usr/hotfolder/duplex" 3503, a job ticket "duplex.xml" 3504 related to this hot folder is stored. This job ticket was stored herein when the job ticket was generated by the user interface controller 3405 and the job ticket generator 3404. In directories below "/usr/hotfolder" 3502, directories for hot folders specified by a user are created, and job tickets created according to settings made by the user are stored in respective these directories. To relate job tickets to corresponding hot folders, in the present embodiment, job tickets are stored in corresponding hot folders. Alternatively, for example, job tickets may be stored in arbitrary storage areas and the correspondence between job tickets and hot folders may be described in a table.

[Exemplary Process Performed by Printer]

Figure 36:
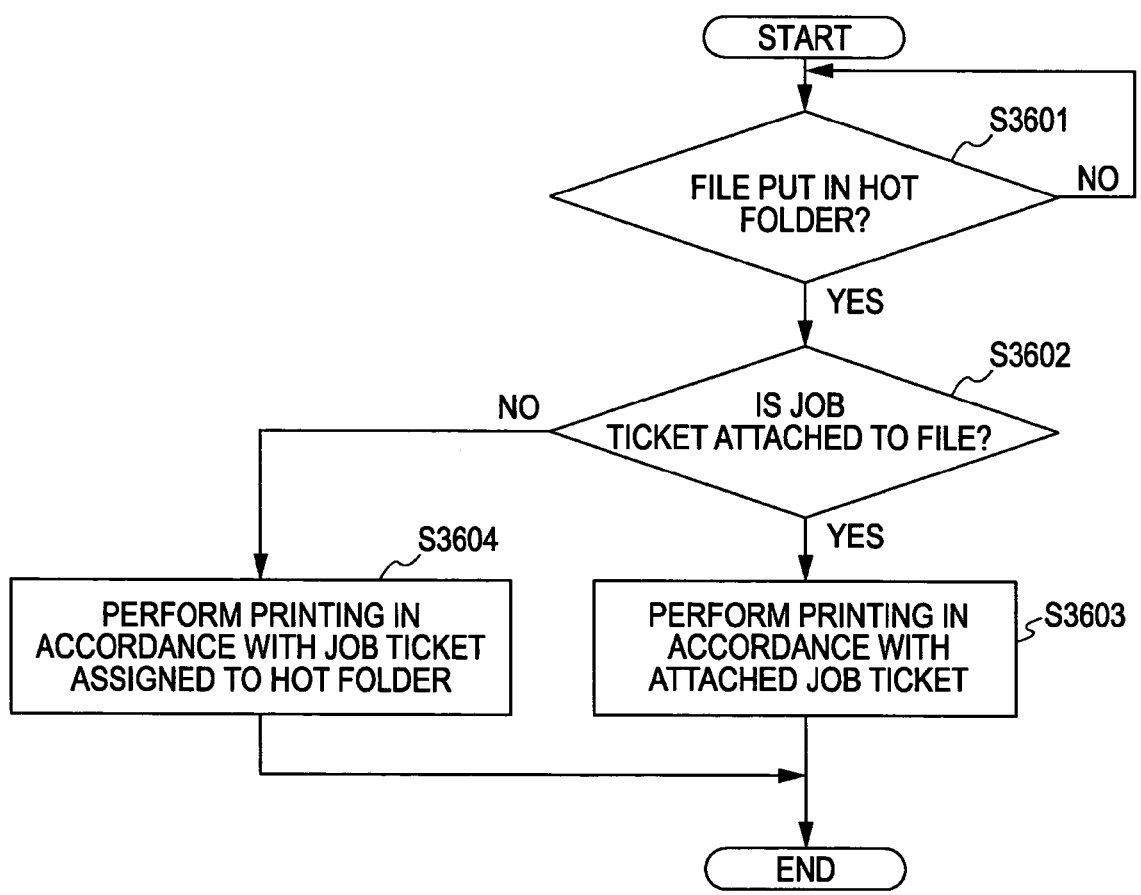
FIG. 36 is a flow chart of an exemplary printing process performed by a printer according to an aspect of the present embodiment.

FIG. 36 shows an exemplary process associated with a hot folder performed by the printer 3302. In step S3601, the job monitoring/generation controller 3406 monitors whether a file is dropped into one of folders in directories at levels below "/usr/hotfolder" 3502. This step S3601 is performed repeatedly until arrival of a file is detected.

If arrival of a file at a hot folder is detected, then in step S3602 it is determined whether a job ticket is attached to the received job. If it is determined that there is a job ticket attached to the received job, then in step S3603 printing is performed in accordance with the job ticket. In a case in which there is no job ticket attached to the job, the process proceeds to step S3604. In step S3604, printing is performed in accordance with the job ticket related to the hot folder. For example, when a file with no attached job ticket is received at the hot folder 3503, the job ticket "/usr/hotfolder/duplex/duplex.xml" 3504 is used.

[Exemplary User Operation]

Now, a user operation is described. For a hot folder on a computer, a user sets print properties in a manner similar to that disclosed in first to third embodiments, and performs printing using the hot folders. As described above, when a file is printed using a hot folder located on a printer, it is allowed to change print properties before printing is started if print properties are set as changeable.

Other Exemplary Embodiments

Note that the present invention can also be implemented by providing, to a system or an apparatus, a storage medium having software program code stored thereon and reading and executing the program code on a computer (or a CPU or a MPU) disposed in the system or the apparatus thereby implementing the functions disclosed in the embodiments described above. In this case, the program code read from the storage medium implements the novel functions disclosed in the embodiments described above, and the storage medium on which the program code is stored and the program code itself fall within the scope of the present invention.

Specific examples of storage media which can be employed in the present invention to supply the program code include a floppy disk, a hard disk, an optical disk, a magneto-optical disk, a CD-ROM, a CD-R, a DVD-R, a DVD-RW, a DVD-RAM, a DVD+R, a DVD-RW, a magnetic tape, a non-volatile memory card, and a ROM.

The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-189937 filed Jun. 29, 2005, which is hereby incorporated by reference herein in its entirety.

What is claimed is:

1. An information processing apparatus including a memory and a processor comprising:
   a hot folder control unit configured to control a hot folder which acts as a storage area to store document data and of which adds a plurality of print attributes associated with the hot folder to the document data when the document data is stored in the hot folder;
   a setting unit configured to set changeability information indicating whether each of the plurality of the print attributes is allowed to be changed when the document data is stored in the hot folder;
   a storage unit configured to store the plurality of print attributes and the changeability information set in the setting unit in association with the hot folder;
   a displaying unit configured to obtain the plurality of print attributes and the changeability information set in the setting unit, and to display a resetting screen to accept a change of the print attribute set to be changeable in the setting unit, when the document data is stored in the hot folder;
   a generation unit configured to generate a job ticket in which the plurality of print attributes and changeability information are described in a structured language; and
   a central control unit configured to control the hot folder control unit, the setting unit, the storage unit, the displaying unit and the generation unit, wherein the central control unit controls the displaying unit so as to display the resetting screen in accordance with the changeability information described in the job ticket when the document data is stored in the hot folder.

2. The information processing apparatus according to claim 1, wherein the document data is stored in the hot folder by using a drag and drop function of the information processing apparatus.

3. The information processing apparatus according to claim 1, further comprising a determination unit configured to, when the print attribute is changed via the resetting screen, determine whether the changed print attribute meets a condition required in printing.

4. The information processing apparatus according to claim 3, wherein when the determination unit determines that the changed print attribute does not meet the condition required in printing, the display unit again displays the resetting screen for resetting the changed print attribute.

5. The information processing apparatus according to claim 1, wherein the print attribute includes at least one of a paper size, a paper type, a number of printing, a page layout, a name of a printer, and a mode for single/double-sided printing.

6. An information processing method implemented in an information processing apparatus including a memory and a processor, which utilizes a hot folder control unit configured to control a hot folder which acts as a storage area to store document data and of which adds a plurality of print attributes associated with the hot folder to the document data when the document data is stored in the hot folder, the method comprising:

via a setting unit, setting changeability information indicating whether each of the plurality of the print attributes is allowed to be changed when the document data is stored in the hot folder;

via a storage unit, storing the plurality of print attributes and the changeability information set in association with the hot folder;

via a displaying unit, obtaining the plurality of print attributes and the set changeability information, and displaying a resetting screen to accept a change of the print attribute set to be changeable, when the document data is stored in the hot folder;

via a generating unit, generating a job ticket in which the plurality of print attributes and changeability information are described in a structured language; and via central control unit, controlling the hot folder control unit so as to display the resetting screen in accordance with the changeability information described in the job ticket when the document data is stored in the hot folder.

7. The information processing method according to claim 6, wherein the document data is stored in the hot folder by using a drag and drop function of the information processing apparatus.

8. The information processing method according to claim 6, further comprising determining whether the changed print attribute meets a condition required in printing when the print attribute is changed via the resetting screen.

9. The information processing method according to claim 8, wherein when the determination is that the changed print attribute does not meet the condition required in printing, the resetting screen is displayed again for resetting the print attribute.

10. The information processing method according to claim 6, wherein the print attribute includes at least one of a paper size, a paper type, a number of printing, a page layout, a name of a printer, and a mode for single/double-sided printing.

11. A computer-readable storage medium containing computer-executable instructions for controlling an information processing apparatus including a memory and a processor, which utilizes a hot folder control unit configured to control a hot folder, which is a storage area to store document data and adds a plurality of print attributes associated with the hot folder to document data when the document data is stored in the hot folder, the storage medium comprising:

computer-executable instructions for setting changeability information indicating whether each of the plurality of the print attributes is allowed to be changed when the document data is stored in the hot folder;

computer-executable instructions for storing the plurality of print attributes and the changeability information set in association with the hot folder;

computer-executable instructions for obtaining the plurality of print attributes and the set changeability information, and displaying a resetting screen to accept a change of the print attribute set to be changeable, when the document data is stored in the hot folder;

computer-executable instructions for generating a job ticket in which the plurality of print attributes and changeability information are described in a structured language; and computer-executable instructions for controlling the hot folder control unit so as to display the resetting screen in accordance with the changeability information described in the, job ticket when the document data is stored in the hot folder.

* * * * *